(12) United States Patent
Hetzler et al.

(10) Patent No.: US 8,089,634 B2
(45) Date of Patent: Jan. 3, 2012

(54) OPTICAL ELEMENT AND METHOD OF CALIBRATING A MEASURING APPARATUS COMPRISING A WAVE SHAPING STRUCTURE

(75) Inventors: Jochen Hetzler, Aalen (DE); Frank Schillke, Aalen (DE); Stefan Schulte, Aalen-Waldhausen (DE); Rolf Freimann, Aalen (DE); Bernd Doerband, Aalen (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 0 days.

(21) Appl. No.: 12/684,632

(22) Filed: Jan. 8, 2010

(65) Prior Publication Data
US 2010/0177321 A1     Jul. 15, 2010

Related U.S. Application Data

(63) Continuation of application No. PCT/EP2008/005547, filed on Jul. 8, 2008.

(30) Foreign Application Priority Data

Jul. 9, 2007  (EP) .................. PCT/EP2007/006069
Jul. 26, 2007 (EP) .................. PCT/EP2007/006639

(51) Int. Cl.
G01B 9/02 (2006.01)
G01B 11/02 (2006.01)
(52) U.S. Cl. ........................ 356/513; 356/521
(58) Field of Classification Search .............. 356/512, 356/521, 513, 514, 515
See application file for complete search history.

(56) References Cited

U.S. PATENT DOCUMENTS

| | | | |
|---|---|---|---|
| 4,936,665 | A | 6/1990 | Whitney |
| 5,155,553 | A | 10/1992 | Chen |
| 5,530,547 | A | 6/1996 | Arnold |
| 6,879,402 | B2 | 4/2005 | Kuechel |
| 6,908,200 | B1 | 6/2005 | Yoshikawa et al. |
| 6,940,607 | B2 | 9/2005 | Freimann et al. |
| 6,972,849 | B2 | 12/2005 | Kuechel |
| 7,019,842 | B2 | 3/2006 | Holzapfel et al. |
| 7,023,562 | B2 | 4/2006 | De Lega |
| 7,024,066 | B1 | 4/2006 | Malendevich et al. |
| 7,025,468 | B2 | 4/2006 | Nishioka et al. |
| 7,050,175 | B1* | 5/2006 | Freimann et al. ............ 356/512 |

(Continued)

FOREIGN PATENT DOCUMENTS

DE     32 40 360 A1    5/1984
(Continued)

OTHER PUBLICATIONS

Peng Su et. al., "Dual beam generation at a ray caustic by a multiplexing computer-generated hologram", Jun. 27, 2005, Optics Express vol. 13, No. 13,, pp. 4843 et seq.
S. Arnold, "CGH null correctors enable testing of aspheric surfaces using standard interferometers", SPIE's OE magazine, Aug. 2002, p. 40.

(Continued)

Primary Examiner — Patrick J Connolly
(74) Attorney, Agent, or Firm — Sughrue Mion, PLLC

(57) ABSTRACT

Optical element having an optical surface, which optical surface is adapted to a non-spherical target shape, such that a long wave variation of the actual shape of the optical surface with respect to the target shape is limited to a maximum value of 0.2 nm, wherein the long wave variation includes only oscillations having a spatial wavelength equal to or larger than a minimum spatial wavelength of 10 mm.

20 Claims, 14 Drawing Sheets

U.S. PATENT DOCUMENTS

| | | | |
|---|---|---|---|
| 7,061,626 B1* | 6/2006 | Schillke et al. | 356/513 |
| 7,118,449 B1* | 10/2006 | Dinger et al. | 451/6 |
| 7,123,365 B1* | 10/2006 | Schulte | 356/512 |
| 7,177,031 B2 | 2/2007 | Kessler et al. | |
| 7,481,543 B1* | 1/2009 | Dinger et al. | 359/838 |
| 7,605,926 B1 | 10/2009 | Hetzler et al. | |
| 7,848,031 B2 | 12/2010 | Hetzler et al. | |
| 2001/0028462 A1* | 10/2001 | Ichihara et al. | 356/512 |
| 2003/0184762 A1 | 10/2003 | Kim et al. | |
| 2004/0174624 A1 | 9/2004 | Weiser et al. | |
| 2005/0157311 A1 | 7/2005 | Kuchel | |
| 2005/0225774 A1 | 10/2005 | Freimann et al. | |
| 2005/0275849 A1* | 12/2005 | Freimann et al. | 356/521 |
| 2006/0274325 A1* | 12/2006 | Hetzler et al. | 356/521 |
| 2007/0058269 A1 | 3/2007 | Mann et al. | |
| 2008/0043247 A1* | 2/2008 | Arnold et al. | 356/512 |
| 2008/0068613 A1 | 3/2008 | Kuchel | |
| 2009/0128829 A1 | 5/2009 | Schillke et al. | |
| 2010/0177321 A1* | 7/2010 | Hetzler et al. | 356/512 |

FOREIGN PATENT DOCUMENTS

| | | | |
|---|---|---|---|
| DE | 198 20 785 A1 | 10/1999 | |
| DE | 19822453 A1 | 12/1999 | |
| DE | 10125785 A1 | 11/2002 | |
| DE | 10 2005 013 903 A1 | 12/2005 | |
| DE | 10 2005 036 166 A1 | 2/2007 | |
| DE | 102006035022 A1 | 1/2008 | |
| EP | 1 160 589 A1 | 12/2001 | |
| EP | 1324006 B1 | 3/2006 | |
| GB | 2152227 A | 7/1985 | |
| WO | 03001147 A1 | 1/2003 | |
| WO | 03006920 A1 | 1/2003 | |
| WO | 03044456 A1 | 5/2003 | |
| WO | 03048715 A1 | 7/2003 | |
| WO | 2004-046641 A1 | 6/2004 | |
| WO | 2005 114 101 A1 | 12/2005 | |
| WO | 2006-077145 A2 | 7/2006 | |
| WO | 2006077145 A3 | 7/2006 | |
| WO | 2006091415 A2 | 8/2006 | |
| WO | 2008/012091 A2 | 1/2008 | |
| WO | 2008/110239 A1 | 9/2008 | |
| WO | 2009/006914 A1 | 1/2009 | |

OTHER PUBLICATIONS

G. Klose et. al., "High-resolution and high-precision pattern placement metrology for the 45 nm node and beyond", submission for the 24th European Mask and Lithography Conference held Jan. 21-24, 2008.

M. Beyerlein, N. Nindlein, and J. Schwider, "Dual-wave-front computer-generated holograms for quasi-absolute testing of aspherics", Appl. Opt. 41, pp. 2440-2447 (2002).

J. Asfour, A. Poleschuk, "Asphere testing with a Fizeau interferometer based on a combined computer-generated hologram", J. Opt. Soc. Am. A / vol. 23 Iss. 1 (2006).

E. J. Mitemeijer, Paolo Scardi, Diffraction Analysis of the Microstructure of Materials, Materials Science, Springer 2004, p. 9.

W. Vogel, J. Haase, R. Hosemann, "Linienprofilanayse von Roentgen-weitwinkelreflexen . . ." Z. Naturforsch. 29a, 1152-1158 (1974), pp. 1152-1158.

Daniel Malacara, Optical Shop Testing, 2d ed., Chapter 12, 1992, pp. 427-et seq.

A. F. Fercher, "Computer-generated Holograms for Testing Optical Elements . . .", Journal of Modern Optics vol. 23, No. 5, pp. 347-365 (1976).

G. Schlueter et. al., "Next generation mask metrology tool", Proceedings of SPIE vol. 4754 (2002), pp. 758 et seq.

Seitz, Guenter: "Hochaufgeloeste interferometrische Absolutmessung roationssymmetrischer Oberflaechen-Fehler", DGaO-Proceedings 2006.

Jensen, A.E.: "Absolute Calibration Method for Laser Twyman-Green Wave-Front Testing Interferometers", Journal Optical Society of America, 1973, vol. 663, p. 1313.

Elssner et al.: Absolute sphericity measurement, Applied Optics, 1989, vol. 28, No. 21, p. 4649-4661.

Smythe, Robert: "Interferometry: Asphere interferometry powers precision lens manufacturing", Laser Focus World, Oct. 2006.

Optical Shop Testing, Second Edition, edited by Daniel Malacara, Wiley Interscience Punlication (1992), Chapters 2, 12 and 15.

Creath et al.: "Absolute Measurement of Spherical Surfaces", SPIE vol. 1332, p. 2-7, 1990.

* cited by examiner a)

b)

c)

OPTICAL ELEMENT AND METHOD OF CALIBRATING A MEASURING APPARATUS COMPRISING A WAVE SHAPING STRUCTURE

This application is a continuation of International Patent Application PCT/EP2008/005547, filed on Jul. 8, 2008, and claiming priority from International Patent Applications PCT/EP2007/006069 and PCT/EP2007/006639, filed on Jul. 9, 2007 and Jul. 26, 2007, respectively. The complete disclosures of these international patent applications are incorporated into this application by reference.

FIELD OF AND BACKGROUND OF THE INVENTION

The present invention relates to the technical field of manufacturing optical elements and testing of optical elements using a measuring apparatus like, for example, an interferometer. In particular, the present invention relates to a method of calibrating a measuring apparatus comprising a wave shaping device and an optical element manufactured for example using such a calibrated measuring apparatus.

The optical element can for example be an optical lens or an optical mirror used in an optical system, such as a telescope used in astronomy or a projection optical system used for imaging structures, such as structures disposed on a mask or reticle, onto a radiation sensitive substrate, such as a resist on a wafer, in a microlithographic method. The performance of such an optical system largely depends on the accuracy with which the optical surface can be processed or manufactured to have a target shape determined by a designer of the optical system. In such manufacture it is necessary to compare the shape of the processed optical surface with its target shape, and to determine differences between the processed surface and the target surface. The optical surface may then be further processed at those portions at which differences between the machined and target surfaces exceed for example predefined thresholds.

In a conventional method, an optical test surface, which can be of aspherical shape, is disposed in a beam path of incoming measuring light of an interferometer. The interferometer comprises a wave shaping element, also called compensation system, that shapes the beam of the measuring light such that the measuring light is substantially orthogonally incident on the optical surface at each location thereof. Thus, the wavefront of the measuring light has substantially the same shape as the surface shape of the optical surface, on which the measuring light is orthogonally incident. Compensation systems are also referred to as null-lenses, null-lens systems, K-systems and null-correctors. Background information relating to such compensating systems is available for example from chapter 12 of the text book of Daniel Malacara "Optical Shop Testing", $2^{nd}$ edition, John Wiley & Sons, Inc. 1992.

For testing complex aspheres often computer generated holograms (CGH's) are used as compensation systems. For obtaining a highly precise measurement of the shape of the optical test surface all manufacturing errors of the elements in the cavity of the measuring interferometer have to be known precisely. Alternatively, a calibration asphere can be used for calibrating such errors. Often, however, such a calibration asphere is not available. Sometimes a CGH operated in transmission followed by a mirror is used as a calibration object for calibrating the interferometer. The accuracy of the calibration CGH, however, is not better than the accuracy of the compensation system. It is further necessary, to align the calibration CGH to the mirror, which is another source of errors.

SUMMARY OF THE INVENTION

The present invention has been accomplished taking the above problems into consideration.

According to a first aspect of the invention a method of calibrating a measuring apparatus comprising a wave shaping structure is provided. The wave shaping structure is configured for adapting a wavefront of an incoming wave of electromagnetic radiation to a non-spherical target shape of an optical test surface. The method comprises the following steps: irradiating the wave shaping structure with the incoming wave to generate upon interaction of the incoming wave with the wave shaping structure an adapted wave having a wavefront adapted to the target shape, irradiating a diffractive calibration structure with the adapted wave, which diffractive calibration structure is configured such, that the adapted wave is diffracted in reflection at the diffractive calibration structure, wherein the radiation generated thereby for a certain diffraction order forms a calibration beam having a distinct propagation direction and being in auto collimation with the adapted wave, and determining calibration errors of the measuring apparatus by analyzing the calibration beam.

Put in different words, a wave shaping structure is irradiated with the incoming wave, whereby the incoming wave is converted into an adapted wave, the wavefront of which is adapted to the target shape of the optical test surface. Thus, the wavefront of the adapted wave substantially has the same shape as the optical test surface and therefore the single rays of the adapted wave would be orthogonally incident on the optical test surface, if the optical test surface was arranged in the optical path of the adapted wave. The target shape can for example be aspherical. The measuring apparatus comprising the wave shaping device can also be referred to as K-system. The invention provides a method to calibrate such a system.

According to the first aspect of the invention a diffractive calibration structure, which can be configured as a CGH, is arranged in the optical path of the adapted wave in a position, in which so-called Littrow-reflection occurs. Thereby the diffraction does not occur in transmission, but rather in reflection at the calibration structure. According to the invention the radiation generated for a certain diffraction order forms a calibration beam.

The diffractive calibration structure is configured such, that the calibration beam has a distinct propagation direction. This is in contrast to for example a multiplexed CGH, in which a certain diffraction order typically does not have a distinct propagation direction. In the case of a multiplexed CGH the single partial diffraction patterns create respective diffraction rays of the given diffraction order, which diffraction rays propagate in different propagation directions. The diffractive calibration structure according to the inventive embodiment, however, generates for a certain diffraction order a beam, which has only a single propagation direction. This beam is referred to as calibration beam and is in auto collimation with the adapted wave. The beam is therefore running in the same optical path as the adapted wave, but in the opposite direction. The calibration beam is analyzed, which allows information useful for calibrating the measuring apparatus to be generated.

The diffractive calibration structure according to the invention operated in Littrow-reflection as described above does not require a separate mirror to reflect the diffracted light. Therefore, an alignment between the diffractive device and a mirror, which is required in conventional calibration solutions, can be dispensed with. This way, possible alignment errors are avoided and the calibration measurement is facilitated. The accuracy of the calibration measurement can therefore be improved. Further, by assuring that the calibration beam has a distinct propagation direction, an ambiguity in the analyzation of the calibration beam can be reduced to a minimum. This further enhances the accuracy of the inventive calibration method. Further, weight and cost can be saved by dispensing the requirement of a further mirror.

In a further embodiment according to the first aspect of the invention the diffractive calibration structure comprises a diffractive pattern, in particular a grating, having a single periodicity. This is in contrast to for example multiplexed CGH's, which have diffractive patterns, respectively containing multiple periodicities. The calibration beam generated by such a diffractive pattern having a single periodicity can be analysed with little or without ambiguity.

In a further embodiment according to the first aspect of the invention the wavefront of the adapted wave is rotationally symmetric. By generating the adapted wave such that its wavefront is rotationally symmetric, it is possible, to perform an absolute calibration of all non-rotationally symmetric errors of the diffractive calibration structure by conducting a measurement at different rotational positions of the diffractive calibration structure with respect to the axis of symmetry of the rotationally symmetric adapted wave. The measurements at the different rotational positions then allow non-rotationally symmetric errors in the pattern of the diffractive calibration structure to be corrected for computationally in the measurement result. This way a more accurate calibration of the wave shaping structure can be achieved.

In a further embodiment according to the first aspect of the invention the diffractive calibration structure comprises a diffractive pattern being rotationally non-symmetric. The rotationally non-symmetric pattern can be calibrated, as mentioned before, by employing a rotationally symmetric adapted wave. By providing the diffractive pattern of the calibration structure with non-rotational symmetry, the remaining errors of the diffractive calibration structure can be reduced to a minimum.

In a further embodiment according to the first aspect of the invention the wavefront of the adapted wave is non-spherical. Non-spherical in this context means that the adapted wave is neither spherical nor plane. Such waves are often also referred to as aspherical.

In a further embodiment according to the first aspect of the invention the diffractive calibration structure has a diffractive surface and the diffractive calibration structure is arranged in the optical path of the adapted wave at such a tilt with respect to an average propagation direction of the adapted wave, that no single ray of the adapted wave impinges on the diffractive surface perpendicularly, which diffractive surface is configured such, that the adapted wave is diffracted in reflection at the diffractive surface, wherein the diffracted radiation generated thereby forms the calibration beam.

Put in different words, according to this embodiment of the invention all single rays of the adapted wave impinge on the diffractive surface at angles different from 90°, in particular at angles larger than 90.5° or smaller than 89.5°. This way a break of symmetry in the diffractive pattern on the diffractive surface is achieved. That means the diffractive pattern on the diffractive surface lacks rotational symmetry. With this it is possible to calibrate out errors in the diffractive pattern as explained with respect to a previously described embodiment of the invention. Measurements can be made at different rotational positions of the diffractive calibration structure and the non-rotationally symmetric errors can be calibrated out computationally. As the diffractive calibration structure is arranged at such a tilt with respect to the average propagation direction of the adapted wave, that no single ray of the adapted wave impinges on the diffractive surface perpendicularly, the diffractive structures on the diffractive surface lack rotational symmetry. In an embodiment according to the invention the surface normal of the diffractive surface is tilted with respect to the average propagation direction of the adapted wave by an angle of larger than 1°, in particular 2.7°.

According to a further embodiment of the invention the diffractive calibration structure comprises a phase CGH, which is configured such, that the adapted wave is diffracted in reflection at the diffractive calibration structure, wherein the diffracted radiation generated thereby forms the calibration beam.

A phase CGH is a computer generated hologram with which the phase and not the amplitude of the wave interacting therewith is influenced. This is in contrast to an amplitude CGH or amplitude grating. In an ideal phase CGH the intensity of the incoming wave is not reduced, which is different to an amplitude grating. A phase CGH is typically structured by providing diffractive structures at different step heights.

In a further embodiment according to the first aspect of the invention the analyzing of the calibration beam is performed after the calibration beam has interacted with the wave shaping structure. The electromagnetic radiation of the incoming wave therefore interacts two times with the wave shaping device. In one example, the radiation first passes through the wave shaping structure to form the adapted wave, and the calibration beam reflected back from the calibration structure passes through the wave shaping structure as well.

In a further embodiment according to the first aspect of the invention the diffractive calibration structure is configured such, that the effect it has on the adapted wave upon generation of the diffracted wave corresponds to the effect a target shaped surface has on the adapted wave upon reflection on the target shaped surface if arranged in the optical path of the adapted wave instead of the diffractive calibration structure. The effect on the adapted wave in particular refers to the effect on the wavefront of the adapted wave. The diffractive calibration structure is therefore configured such, that it simulates a test object having a target shaped optical surface.

In a further embodiment according to the first aspect of the invention the calibration beam is formed from first diffraction order radiation generated by the diffraction of the adapted wave at the diffractive calibration structure. Forming the calibration beam from the first diffractive order radiation awards the calibration beam a particularly high intensity. In an alternative embodiment a higher diffraction order radiation can be used for the calibration beam. This allows the diffractive calibration structure to be configured more coarsely without compromise in the precision of the calibration measurement.

In a further embodiment according to the first aspect of the invention the diffractive calibration structure is subsequently arranged in at least two different rotational positions with respect to the axis of rotational symmetry of the wavefront of the adapted wave and an absolute calibration of rotationally non-symmetric errors is performed by analyzing the resulting calibration beam for each of the at least two rotational positions. As already described above, a turn averaging method can be used to calibrate out the non-symmetric errors from the calibration measurement.

In a further embodiment according to the first aspect of the invention the wave shaping structure and/or the diffractive calibration structure is arranged on a diffractive surface, which diffractive surface comprises at least one diffractive monitoring structure, and the pattern generated by the diffractive monitoring structure is analyzed to monitor a bending of the diffractive surface during the calibration operation. This can be implemented such, that the diffractive monitoring structure influences a portion of an interference pattern generated by the interference of the calibration beam with the reference beam. By analyzing the interference pattern, an amount of a bending of the diffractive surface present during the calibration operation can be determined.

According to a second aspect of the invention another method of calibrating a measuring apparatus comprising a wave shaping structure is provided. The wave shaping structure is configured for adapting a wavefront of an incoming wave of electromagnetic radiation to a non-spherical target shape of an optical test surface. The method comprises the step of providing a diffractive calibration structure, which comprises first portions and second portions being arranged in an alternating sequence, each of which first portions contains a grating structure. The diffractive calibration structure is configured for operation in a first diffraction mode and a second diffraction mode. In the first diffraction mode an incident non-spherical wave is reflected at the diffractive calibration structure and thereby a diffracted wave is generated, which has the same wavefront as the incident non-spherical wave after reflection at a reference surface having the target shape. In the second diffraction mode an incident spherical wave is retroreflected into itself. The method further comprises the steps of: irradiating the diffractive calibration structure with the spherical wave to reflect the spherical wave at the diffractive calibration structure in the second diffraction mode and determining from the reflected spherical wave a distortion of the diffractive calibration structure with respect to a design configuration of the diffractive calibration structure, irradiating the wave shaping structure with the incoming wave to generate upon interaction of the incoming wave with the wave shaping structure an adapted wave having a wavefront adapted to the target shape, generating a calibration wave by reflecting the adapted wave at the diffractive calibration structure in the first diffraction mode, and analyzing the calibration wave taking the determined distortion of the diffractive calibration structure into account and thereby determining calibration errors of the measuring apparatus.

Put in different words, according to the second aspect of the invention a diffractive calibration structure is used in reflection. The diffractive calibration structure comprises first portions and second portions, e.g. in the form of first stripes and second stripes, being arranged in an alternating sequence. The diffractive calibration structure is therefore sub-aperture coded and has different phase functions encoded into locally separated areas. The diffractive calibration structure is configured for operation in the above described first diffraction mode and second diffraction mode.

In the first diffraction mode the diffractive calibration structure simulates the non-spherical target shape of the optical test surface in that the non-spherical adapted wave generated by the wave shaping structure is reflected by the diffractive calibration structure such that the reflected wave corresponds to the wave, which would be reflected, if an optical surface having the target shape would be arranged instead of the diffractive calibration structure. This way the diffractive calibration structure serves for calibrating the measuring apparatus.

The calibration method of the measuring apparatus includes a calibration of the diffractive calibration structure by determining a distortion of the diffractive calibration structure. This is done by irradiating the diffractive calibration structure with a spherical wave and using the reflected spherical wave to determine the distortion with respect to the design configuration of the diffractive calibration structure.

This distortion measurement can for example be performed according to the method described in U.S. Pat. No. 6,940,607 B2, which document is incorporated herein by reference. According to the method described in the document, the calibration structure is arranged subsequently in an intrafocal position and an extrafocal position with respect to the incoming spherical wave. The waves retro-reflected in the two different positions of the diffractive calibration structure are analyzed interferometrically to determine the distortion.

The term "distortion" in the context of this application defines a distribution of local deviations of single locations of the diffractive calibration structure with respect to the respective locations of a design configuration of the diffractive calibration structure. The local deviations referred to are deviations in a plane, in which the diffractive calibration structure extends. Distortion errors can also be referred to as grid errors.

The distortion of the diffractive calibration structure is typically generated during the printing of the diffractive calibration structure by imaging a mask structure onto a substrate. A distortion in the imaging optics used for the printing process causes a distorted image on the substrate. The image on the substrate is then chemically developed and typically etched to produce a physical diffractive calibration structure in the substrate. The distortion of the image can be modified by the etching process. Overall however, the distortion of the resulting diffractive calibration structure is typically dominated by the distortion introduced during the preceeding printing process.

The distortion of the diffractive calibration structure determined from the reflected spherical wave is then used during calibration of the measuring apparatus. The measuring apparatus is calibrated using the first diffraction mode of the diffractive calibration structure. Therein an adapted wave having a wavefront adapted to the target shape of the optical test surface is generated by irradiating the wave shaping structure with an incoming wave. The adapted wave is reflected at the diffractive calibration structure in the second diffraction mode and the wave reflected by the diffractive calibration structure, referred to as calibration wave, is analyzed using an interferometer. Thereby calibration errors of the measuring apparatus are determined, wherein the determined distortion of the diffractive calibration structure is taken into account, that means the determined calibration errors are corrected for by the errors introduced into the calibration measurement by the distortion of the diffractive calibration structure.

As mentioned above, the diffractive calibration structure is operated in reflection, both during the calibration of the diffractive calibration structure itself and during the calibration of the measuring apparatus. This has a number of advantages compared to the use of a diffractive structure operated in transmission. One advantage is that the etch depth of the diffractive calibration structure in the substrate carrying the diffractive calibration structure is smaller. Therefore the desired etch depth can be obtained with a better accuracy. Further, only one reflection occurs at the diffractive calibration structure instead of a double transmission, which leads to a higher yield in the usable light yielding a better signal to noise ratio in the measurement signal and less background reflexes.

In a further embodiment according to the second aspect of the invention each of the first portions is configured to form a first phase function designed to reflect the incident non-spherical wave in the first diffraction mode, and each of the second portions is configured to form a second phase function designed to retro-reflect the incident spherical wave into itself in the second diffraction mode. Therefore, the first portions contain diffractive elements, like a diffractive grating, which are configured such that each of the first portions contain the phase function necessary to carry the calibration wave when irradiated by the adapted wave. Each of the second portions contains a phase function designed to retro-reflect the incident spherical wave into itself.

In a further embodiment according to the second aspect of the invention the first portions are configured to form a first phase function and the first portions and the second portions are arranged as a super grating, which super grating is configured to form a second phase function, a first diffracted wave is generated by diffraction of the incident non-spherical wave at the first phase function, a second diffracted wave is generated by diffraction of the incident non-spherical wave at the second phase function in a given diffraction order, a third diffracted wave is generated by diffraction of the incident spherical wave at the first phase function and a fourth diffracted wave is generated by diffraction of the incident spherical wave at the second phase function in another given diffraction order, wherein the given diffraction order of the fourth diffracted wave differs from the given diffraction order of the second diffracted wave. The phase functions are designed such that the reflected wave of the first diffraction mode is generated by superposition of the first diffracted wave with the second diffracted wave, and the reflected wave of the second diffraction mode is generated by superposition of the third diffracted wave with the fourth diffracted wave.

Therefore the adapted wave reflected at the diffractive calibration structure in the first diffraction mode is generated by superposition of the wave diffracted at the first portions with the adapted wave diffracted at the super grating in a given diffraction order. The reflected spherical wave of the second diffractive mode is generated by superposition of the spherical wave diffracted at the first portions and the spherical wave diffracted at the super grating in a diffraction order different from the diffraction order under which the adapted wave is diffracted.

In a further embodiment according to the second aspect of the invention the first phase function comprises a spherical phase sub-function in combination with half of the given non-spherical phase sub-function and the second phase function comprises half of the given non-spherical phase sub-function. The given diffraction order of the fourth diffracted wave and the given diffraction order of the second diffracted wave are of the same absolute value but of opposite algebraic sign. For example, the diffraction order of the fourth diffracted wave is +1. order and the diffraction order of the second diffracted wave is −1. order. The spherical phase sub-function is designed to retro-reflect the spherical wave into itself in the first diffraction mode and the full non-spherical phase sub-function is designed to reflect the incident non-spherical wave in the second diffraction mode.

According to a third aspect of the invention another method of calibrating a measuring apparatus configured for measuring a deviation of an optical test surface from a non-spherical target shape is provided. The calibration method comprises the steps of: providing a diffractive main structure extending over a diffractive surface, at which further a diffractive monitoring structure is arranged such that it extends at several locations of the diffractive surface, irradiating the diffractive surface with a plane calibration wave and generating diffracted calibration radiation upon diffraction of the calibration wave at the diffractive monitoring structure. The method further comprises the steps of: recording a first interference pattern generated by interference of a reference wave with a first one of two different diffraction orders of the diffracted calibration radiation and recording a second interference pattern generated by interference of the reference wave with a second one of the two different diffraction orders of the diffracted calibration radiation. Further the method comprises the steps of: calculating positional errors of the diffractive main structure from the recorded interference patterns, which positional errors are positional errors of the diffractive main structure with respect to a design configuration of the diffractive main structure at at least some of the locations, at which the diffractive monitoring structure extends, and determining calibration errors of the measuring apparatus taking the calculated positional errors of the diffractive main structure into account.

The diffractive main structure can for example be a diffractive wave shaping structure or a diffractive calibration structure as described below in detail. The calibration method according the third aspect of the invention includes a calculation of positional errors of the diffractive main structure with respect to a design configuration of the diffractive main structure. This way, for example, distortion errors of the diffractive main structure, which can also be referred to as grid errors, can be determined. The knowledge of these distortion errors allow the measuring apparatus to be calibrated such that the errors are compensated for when performing the measurement of the optical test surface.

In a further embodiment according to the third aspect of the invention the diffractive main structure is a diffractive wave shaping structure of the measuring apparatus, which diffractive wave shaping structure is configured for adapting a wavefront of an incoming wave of electromagnetic radiation to the non-spherical target shape of the optical test surface. According to this embodiment e.g. the grid errors of the diffractive wave shaping structure can be determined directly. These grid errors are compensated for when measuring the deviation of the optical test surface from its target shape.

In another embodiment according to the third aspect of the invention the measuring apparatus comprises a diffractive wave shaping structure configured for adapting a wavefront of an incoming wave of electromagnetic radiation to the non-spherical target shape of the optical test surface, the diffractive main structure is a diffractive calibration structure configured to generate upon diffraction of an incident non-spherical wave at the diffractive calibration structure a diffracted wave, which has the same wavefront as the incident non-spherical wave after being reflected at a reference surface having the target shape. The method further comprises the steps of: irradiating the diffractive wave shaping structure with the incoming wave to generate upon interaction of the incoming wave with the diffractive wave shaping structure an adapted wave having a wavefront adapted to the target shape, generating a calibration wave by diffracting the adapted wave at the diffractive calibration structure, and analyzing the calibration wave taking the calculated positional errors of the diffractive calibration structure into account and thereby determining calibration errors of the measuring apparatus. In this case errors in the calibration data of the measuring apparatus obtained using the calibration structure which relate to grid or distortion errors of the calibration structure can be eliminated using the method according to the third aspect of the invention.

According to a further embodiment according to the third aspect of the invention the two different diffraction orders of the diffracted calibration radiation used for generating the first and second interference patterns are of the same absolute value, but of different algebraic sign. For example the +1. and −1. diffraction orders can be used.

In a further embodiment according to the third aspect of the invention the diffractive calibration radiation is generated by Littrow-Reflection of the plane calibration wave at the diffractive monitoring structures.

In a further embodiment according to the third aspect of the invention the diffractive main structure is locally a periodic structure and the diffractive monitoring structure has a periodicity, which is smaller than the smallest local periodicity of the diffractive main structure. Advantageously the periodicity of the diffractive monitoring structure is constant over the diffractive surface.

In a further embodiment according to the third aspect of the invention the diffractive monitoring structure is configured as a checkerboard pattern. The diffractive monitoring structure can be made up of stripes, which are arranged with respect to stripes of the diffractive main structure in an alternating sequence. Alternatively the diffractive monitoring structure and the diffractive main structure can be combined in a complexly coded hologram (especially CGH).

In a further embodiment according to the third aspect of the invention the interference patterns are recorded for two different rotational positions of the diffractive main structure with respect to a surface normal of the diffractive surface and the positional errors are calculated from the interference patterns recorded at both rotational positions. This way especially the distortion of the diffractive main structure can be obtained in two dimensions.

According to a fourth aspect of the invention a further method of calibrating a measuring apparatus configured for measuring a deviation of an optical test surface from a non-spherical target shape is provided. The method comprises the step of providing a diffractive main structure extending over a diffractive surface, wherein monitoring elements are further arranged periodically over at least a portion of the diffractive surface, such that the monitoring elements are in alignment with a two-dimensional periodic grid. The method further comprises the steps of: irradiating the diffractive surface with a plane wave and generating diffracted calibration radiation upon diffraction of the plane wave at the monitoring elements, recording respective tilt angles of the diffractive surface, at which single diffraction orders of the diffracted calibration radiation are in autocollimation with the incoming calibration wave, determining a periodicity of the monitoring elements on the diffractive surface from the recorded tilt angles, determining a deviation of a scaling of the diffractive main structure with respect to a scaling of a design configuration of the diffractive main structure, and determining calibration errors of the measuring apparatus from the calculated scaling deviation.

According to the fourth aspect of the invention scaling errors of the diffractive main structure are qualified. As according to the third aspect of the invention the diffractive main structure can be a diffractive wave shaping structure or a diffractive calibration structure. The determined scaling errors of the diffractive main structure allow for a calibration of the measuring apparatus such that the errors are compensated when performing the measurement of the optical test surface.

The term "scaling errors" in this context refers to a deviation in the scaling of the diffractive main structure, which can be configured as a CGH, with respect to the scaling of a design configuration of the diffractive main structure. Such a deviation in scaling is typically generated during the printing process of the diffractive main structure onto the substrate, on which the diffractive main structure is arranged. In case the magnification of the imaging lens of the printing system is not adjusted correctly the scaling of the diffractive main structure deviates from the desired scaling. Put in different words, the diffractive main structure having a scaling deviation is magnified or demagnified with respect to its design.

As already mentioned above, in an embodiment according to the fourth aspect of the invention the diffractive main structure is a diffractive wave shaping structure of the measuring apparatus, which diffractive wave shaping structure is configured for adapting a wavefront of an incoming wave of electromagnetic radiation to the non-spherical target shape of the optical test surface.

In a further embodiment according to the fourth aspect of the invention the measuring apparatus comprises a diffractive wave shaping structure configured for adapting a wave front of an incoming wave of electromagnetic radiation to the non-spherical target shape of the optical test surface, the diffractive main structure is a diffractive calibration structure configured to generate upon diffraction of an incident non-spherical wave at the diffractive calibration structure a diffracted wave, which has the same wavefront as the incident non-spherical wave after being reflected at a reference surface having the target shape. The method further comprises the steps of: irradiating the wave shaping structure with the incoming wave to generate upon interaction of the incoming wave with the wave shaping structure an adapted wave having a wavefront adapted to the target shape, generating a calibration wave by diffracting the adapted wave at the diffractive calibration structure, and analyzing the calibration wave taking the calculated deviation of the scaling of the diffractive calibration structure into account and thereby determining calibration errors of the measuring apparatus.

In a further embodiment according to the fourth aspect of the invention the monitoring elements form a linear diffractive grating at least in sections. That means the linear diffractive grating can have gaps in certain areas. The linear diffractive grating allows a measurement of the scaling errors in one dimension. In order to determine the scaling errors in two dimensions the monitoring elements can form a diffractive cross grating. In a further embodiment according to the fourth aspect of the invention the monitoring elements are punctiform scattering structures.

In one variation according to the fourth aspect of the invention the monitoring structures are arranged periodically in each dimension of the diffractive surface over at least a portion of the diffractive surface. In another variation the monitoring elements are arranged at all grid points of the two-dimensional periodic grid except statistically determined grid points at which no monitoring structure is located. By statistically omitting certain grid points the number of monitoring points is reduced without significantly changing the diffraction effect of the arrangement of the monitoring elements on an incoming light wave.

The analyzing of the calibration beam or calibration radiation according either of the aspects of the invention may include a determination of the wavefront of the calibration beam by interferometric measurement. In such an interferometric measurement an interference pattern is generated by superposition of the calibration beam with a reference wave. The wavefront of the calibration beam is then determined from the interference pattern.

In order to perform such an interferometric measurement the measuring apparatus can be configured as an interferometer. Such an interferometer can for example be a Fizeau-type interferometer. Also a Twyman-Green-type interferometer, examples of which are illustrated in chapter 2.1 of the text book edited by Daniel Malacara, Optical Shop Testing, $2^{nd}$ edition, Wiley and Sons, Inc. 1992, a Michelson-type interferometer, examples of which are illustrated in chapter 2.1 of the text book edited by Daniel Malacara, a Mach-Zehnder-type of interferometer, examples of which are illustrated in chapter 2.6 of the text book edited by Daniel Malacara, a point-diffraction-type interferometer and any other suitable type of interferometer may be used.

According to the invention further a method of measuring a deviation of an actual shape of an optical test surface from a non-spherical target shape is provided. This method comprises the steps of: irradiating a diffractive wave shaping structure with an incoming wave of electromagnetic radiation to generate upon interaction of the incoming wave with the diffractive wave shaping structure an adapted wave having a wave front adapted to the non-spherical target shape, wherein a distortion of the diffractive wave shaping structure with respect to a design configuration of the diffractive wave shaping structure is known with an accuracy of better than 0.1 nm, irradiating the optical test surface with the adapted wave to generate upon interaction of the adapted wave with the optical test surface a measurement wave, measuring the wave front of the measurement wave, and determining the deviation of the actual shape of the optical test surface from the measured wavefront taking the known distortion of the diffractive wave shaping structure into account.

As already detailed above, the term "distortion" refers to a distribution of local deviations of single locations of the diffractive structure, with respect to the respective locations of a design configuration of the diffractive structure in a plane, in which the diffractive structure extends. A scaling error of a diffractive structure measured in the calibration method according to the fourth aspect of the invention is an example of a distortion error in this context. In the above measuring method according to the invention the distortion of the diffractive wave shaping structure is known with an accuracy of better than 0.1 nm. Therefore the uncertainty is less than 0.1 nm. That means, known deviations of single locations of the diffractive wave shaping structure differ from the actual deviations by less than 0.1 nm.

The distortion of the diffractive wave shaping structure with respect to its design configuration is determined for example using a calibration method according to any one of the first to fourth aspects of the invention detailed above. These calibration methods allow a determination of the distortion of the diffractive wave shaping structure with the specified accuracy of 0.1 nm.

In a further embodiment of the measuring method according to the invention the distortion of the diffractive wave shaping structure is known with an accuracy of better than 0.05 nm.

The measuring method using the wave shaping structure of the known distortion allows an optical element to be manufactured having very tight tolerances as detailed below with respect to a fifth and a sixth aspect of the invention.

According to a fifth aspect of the invention further an optical element having an optical surface is provided, which optical surface is adapted to a non-spherical target shape, such that a long wave variation of the actual shape of the optical surface with respect to the target shape is limited to a maximum value of 0.2 nm, wherein the long wave variation includes only oscillations having a spatial wavelength equal to or larger than a minimum spatial wavelength of 10 mm.

Further, according to a sixth aspect of the invention an optical element is provided, which optical element has an optical surface adapted to a non-spherical target shape, wherein a best fitting spherical surface of the target shape has a rotational axis of symmetry and the optical surface has a clear aperture defined by the maximum diameter of the optical surface when viewed in direction of the rotational axis of symmetry, and which optical surface is configured such that a long wave variation of the actual shape of the optical surface with respect to the target shape is limited to a maximum value of 0.2 nm. The long wave variation includes only oscillations having a spatial wavelength equal to or larger than a minimum spatial wavelength of one fifth of the clear aperture.

The clear aperture of the optical surface is defined by the maximum diameter of the optical surface viewed in direction of the rotational axis of symmetry of the best fitting spherical surface of the target shape. As the optical surface has a non-spherical target shape, the perimeter of the optical surface when viewed in direction of the axis of symmetry is not circular. The term "maximum diameter" is to be understood as the longest possible chord within the perimeter of optical surface.

An optical element according to the fifth or the sixth aspect of the invention can for example be manufactured using a calibration method according to the first, second, third or fourth aspect of the invention described above. A measuring apparatus calibrated using one of the above calibration methods is capable of measuring deviations of the actual shape of the optical surface of an optical element with respect to the non-spherical target shape with such an accuracy that the optical surface can be machined subsequently such that the above mentioned tolerances can be met. Currently available optical elements do not meet these specifications.

As illustrated in more detail below, the target shape according to the fifth or sixth aspect of the invention can be a rotationally asymmetric surface represented by the so-called "asphere-equation" specified in the detailed description, an off-centered section of such a rotationally asymmetric surface or a so-called free form surface, illustrated further in the detailed description as well.

The optical element according to the fifth or sixth aspect of the invention is characterized by a long wave variation of the actual shape of its optical surface with respect to the target shape being limited to a maximum value of 0.2 nm. This long wave variation includes only oscillations having a spatial wavelength equal to or larger than a minimum spatial wavelength, which can be 10 mm according to the fifth aspect of the invention or one fifth of the clear aperture according to the sixth aspect of the invention.

The long wave variation is determined as follows: a deviation $D(x, y)$ of the actual shape from the target shape is determined as a function of location $(x, y)$ on the optical surface. The deviation $D(x,y)$ at a given location $(x_0, y_0)$ is transferred from the spatial domain into the frequency domain by performing a Fourier transform, resulting in the function $d(v)$, wherein $v$ is the frequency.

The minimum spatial wavelength $\lambda_{min}$ in the spatial domain, e.g. 10 mm according to the fifth aspect of the invention, is converted into a maximum frequency $v_{max}$ in the frequency domain. Subsequently the maximum amplitude of the function $d(v)$ in the frequency region below the maximum frequency $v_{max}$ is determined. This amplitude value reflects the maximum amplitude at the location $(x_0, y_0)$ of the optical surface and is therefore referred to as (maximum) local amplitude $A_l$. Subsequently local amplitudes $A_l$ are determined for a number of locations $(x_n, y_n)$ on the optical surface.

For qualifying the optical element according to the invention these local amplitudes $A_l$ to be compared with the tolerance value of 0.2 nm. According to a first embodiment of the invention the long wave variation of the actual shape with respect to the target shape is defined by the largest local amplitude $A_l$, i.e. the largest maximum amplitude at any location of the optical surface. The long wave variation of the actual shape from the target shape is therefore according to this embodiment defined as the largest amplitude of deviations of the actual shape from the target shape at any location of the optical surface equal to or larger than the minimum spatial wavelength.

According to a second embodiment of the invention the long wave variation of the actual shape from the target shape is defined by the RMS (root mean square) value of a number of local amplitudes $A_l$, especially the RMS of the local amplitudes $A_l$ at any location on the optical surface. The calculation of the root mean square value is familiar to the person skilled in the art.

Put in different words, according to the second embodiment the long wave variation of the actual shape from the target shape is defined by the RMS value of a number of local amplitudes at respective locations of the optical surface, wherein the local amplitudes are respective maximum amplitudes of deviations of the actual shape from the target shape equal to or larger than the minimum spatial wavelength.

In a further embodiment of the optical element according to the fifth or the sixth aspect of the invention the maximum value, which the long wave variation of the actual shape of the optical surface with respect to the target shape is limited to, is 0.1 nm.

According to a further embodiment of the optical element the target shape of the optical surface is a free form surface having no rotational symmetry and the target shape has a deviation from its best fitting spherical surface of at least 5 μm, in particular of at least 20 μm. That means the target shape deviates from its best fitting spherical suface at at least one location of the target shape by at least 5 μm or at least 20 μm, respectively. According to a variation of the invention the target shape has a deviation from its best fitting sphere of at least 5 μm and at most 10 mm, in particular at most 1 mm.

In an alternative embodiment of the optical element according to the invention the target shape of the optical surface is a rotationally symmetric aspherical surface and the target shape has a deviation from its best fitting spherical surface of at least 500 μm, in particular at least 2.5 mm. Therefore, the target shape deviates from its best fitting spherical suface at at least one location of the target shape by at least 500 μm or at least 2.5 mm, respectively.

In a further embodiment of the optical element according to the invention the target shape of the optical surface is configured as an off-centered section of a rotationally symmetric aspherical surface and the target shape has a deviation from its best fitting spherical surface of at least 500 μm. Such an off-centered section of a rotationally symmetric aspherical surface can also be referred to as "off-axis asphere". In one embodiment the off-centered section does not comprise the apex of the rotationally symmetric aspherical surface.

According to a further embodiment the optical element is manufactured to a tolerance sufficient for microlithographic application, in particular to a tolerance sufficient for microlithographic application using extreme ultraviolet radiation (EUV). The optical element having the mentioned tolerances can be used for example in the projection optics of an exposure tool for microlithography. Tolerances of the optical element can for example be taken from US 2007/0058269 A1, which document is hereby incorporated by reference.

According to a further embodiment of the invention the actual shape of the optical surface deviates from the target shape by a maximum of 0.2 nm, in particular by a maximum of 0.1 nm. That means the overall deviation, independent from the spatial wavelength of the underlying oscillations is at most 0.2 nm or 0.1 nm, respectively.

According to a further embodiment of the invention the optical element is configured as a mirror. In this case the optical element can be used in a EUV-projection exposure tool for microlithography.

According to a further embodiment of the invention a roughness related height variation of the optical surface having a spatial wavelength between 1 μm and 1 mm is less than 70 μm. An optical element having an optical surface of this roughness related height variation is particularly suited for microlithographic application. For determining the roughness related height variation the amplitudes of the deviation function d(v) in the frequency domain are analyzed with respect to the frequency range corresponding to the spatial wavelength range between 1 μm and 1 mm. For the optical surface according to this embodiment the maximum amplitude in this range is less than 70 μm either at any location of the optical surface or with respect to its RMS-value calculated at various locations of the optical surface.

Further, according to the invention a projection objective of a projection exposure tool for microlithography is provided, which projection objective comprises at least one optical element of the type described above with respect to the fifth and sixth aspect of the invention. Preferably two or more optical elements of this type are included in the projection objective according to the invention. Examples of designs of such a projection objective can be taken from US 2007/0058269 A1.

BRIEF DESCRIPTION OF THE DRAWINGS

The foregoing as well as other features of the invention will be more apparent from the following detailed description of exemplary embodiments of the invention with reference to the following diagrammatic drawings, wherein.

DETAILED DESCRIPTION OF EXEMPLARY EMBODIMENTS

Figure 1:
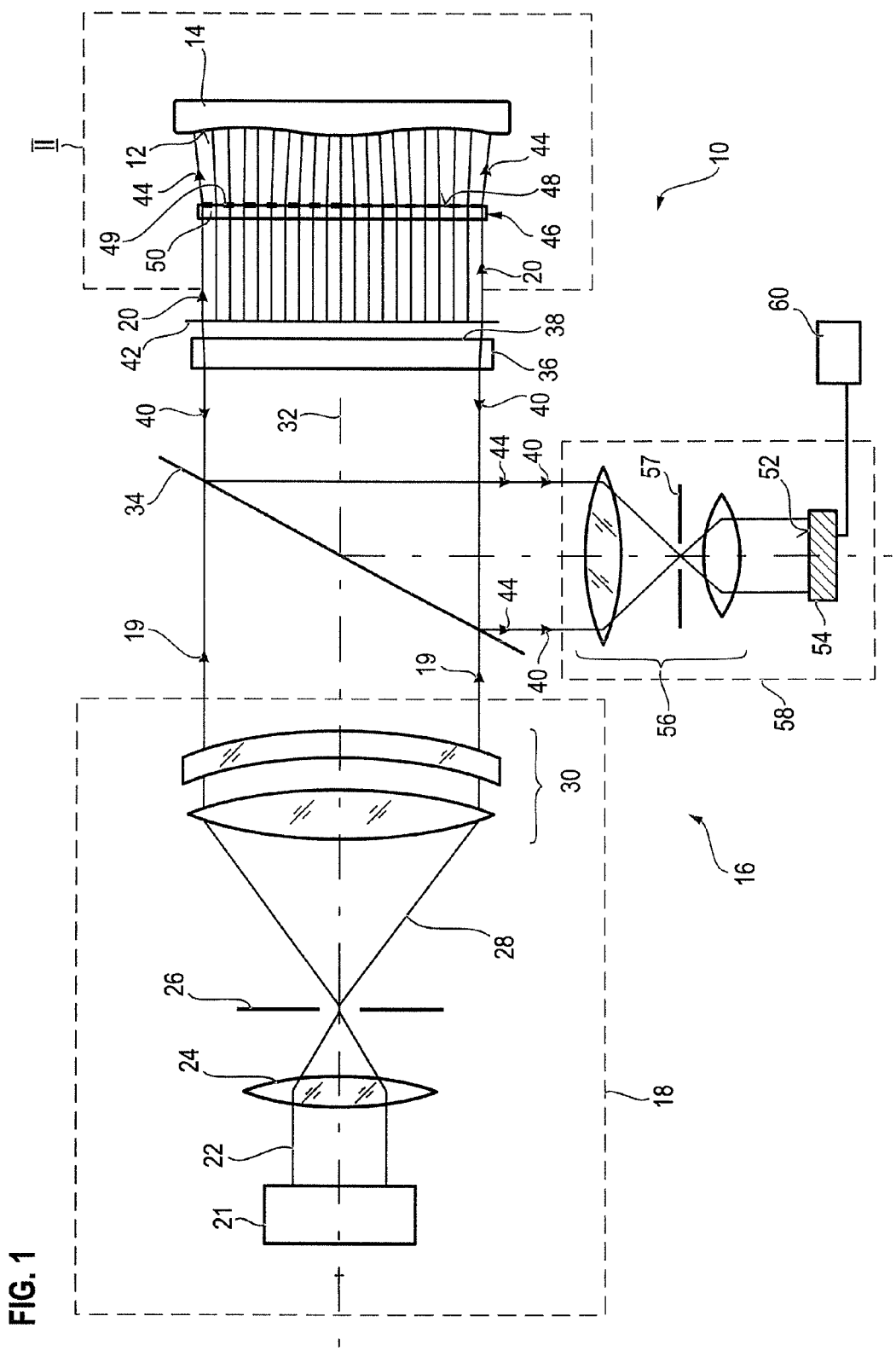
FIG. 1 illustrates an interferometric measuring apparatus comprising a wave shaping device for interferometrically measuring a deviation of an actual shape from an target shape of an optical test surface.

In the embodiments of the invention described below, components that are alike in function and structure are designated, as far as possible, by the same or similar reference numerals. Therefore, to understand the features of the individual components of a specific embodiment, the descriptions of other embodiments or the summary of the invention should be referred to.

FIG. 1 illustrates a measuring apparatus 10 used for interferometrically measuring a deviation of an actual shape from a target shape of an optical test surface 12 of a test object 14. The optical test surface 12 can, for example, be non-spherical in shape. A non-spherical surface can also be referred to as an aspherical surface. The test object 14 can, for example, be a mirror or a transmissive optical lens, etc. The test object 14 is mounted on a test piece holder not shown in the drawing.

The measuring apparatus 10 comprises an interferometer 16, which interferometer 16 comprises a light source unit 18, a beam splitter 34 as well as an interferometer camera 58. The light source unit 18 comprises a laser 21, for example a helium neon laser, emitting a laser beam 22 of coherent light at a wavelength of 632.8 nm. The laser beam 22 is focused by a focusing lens 24 onto a pinhole aperture of a spatial filter 26 such that a diverging beam 28 of coherent light emerges from the pinhole. The wavefront of the diverging beam 28 is in the shown embodiment substantially spherical.

The diverging beam 28 is collimated by a group of lens elements 30 to form an illumination beam 19 having a substantially plane wavefront. The illumination beam 19 travels along an optical axis 32 of the interferometer 16 and traverses the beam splitter 34.

The interferometer 16 illustrated in FIG. 1 is a Fizeau-type interferometer. It is to be noted, however, that the invention is not limited to such an interferometer. Any other type of interferometer, such as a Twyman-Green-type interferometer, a Michelson-type interferometer, a Mach-Zehnder-type interferometer, a point-diffraction-type interferometer and any other suitable type of interferometer may be used.

The illumination beam 19 enters a Fizeau element 36 having a Fizeau surface 38. A portion of the light of the illumination beam 19 is reflected as a reference wave 40 by the Fizeau surface 38. The light of the illumination beam 20 traversing the Fizeau element 36 has a plane wavefront 42 and is in the following designated as incoming wave 20 with respect to a wave shaping device 46 in the form of a diffractive optical element arranged in its beam path.

Optionally, pre-shaping optics transforming the light of the illumination beam 19 having traversed the Fizeau element 36 can be arranged in the beam path for providing the incoming wave 20 with a spherical wavefront. In the example shown in FIG. 1, however, the incoming light wave 20 is a plane wave. The wave shaping device 46 comprises a diffractive surface 48, which diffractive surface 48 comprises a diffractive wave shaping structure 49.

The diffractive wave shaping structure 49 is a hologram, which may be generated by exposing a photographic plate with reference light and light reflected from an optical surface having a surface corresponding to the target shape of the optical test surface 12, or the hologram may be a computer generated hologram (CGH) generated by calculating a corresponding grating using a computer involving methods such as ray tracing and plotting the calculated grating on a surface of a substrate 50. The grating may, for example, be formed by a lithographic method.

The incoming wave 20 is diffracted at the diffractive surface 48 of the wave shaping device 46. The diffracted wave resulting therefrom is referred to as adapted wave 44, which has a wavefront adapted to a target shape of the optical test surface 12. The adapted wave 44 is therefore incident on the optical test surface 12 in auto collimation, on which it is reflected. The wavefront of the reflected adapted wave 44 contains information on the deviation of the actual shape of the optical test surface 12 from its target shape. In an alternative embodiment the adapted wave 44 traverses the optical test surface 12 and is reflected by a subsequent mirror.

As further shown in FIG. 1 the adapted wave 44 having interacted with the optical test surface 12 travels back essentially in the beam path of the incoming wave 20, traverses the Fizeau element 36, and a portion of the reflected adapted wave 44 is reflected by the beam splitter 34. The adapted wave 44 reflected by the beam splitter 34 is imaged onto a photosensitive surface 52 of a camera chip 54 through an objective lens system 56 of the camera 58 including an interferometer stop 57 such that the optical test surface 12 is imaged onto the camera chip 54.

A portion of the reference wave 40 is also reflected by the beam splitter 34 onto the photosensitive surface 52 of the camera chip 54. The reference wave 40 and the reflected adapted wave 44 generate an interference pattern on the photosensitive surface 52. The wave generated by superposition of the reference wave 40 and the adapted wave 44 is referred to as residual wave which generates the interference pattern. The interferometric measuring apparatus 10 further comprises an evaluation device 60 which is adapted for determining the deviation distribution of the actual shape from the target shape of the optical test surface 12 based on the measured interference pattern.

Figure 2:
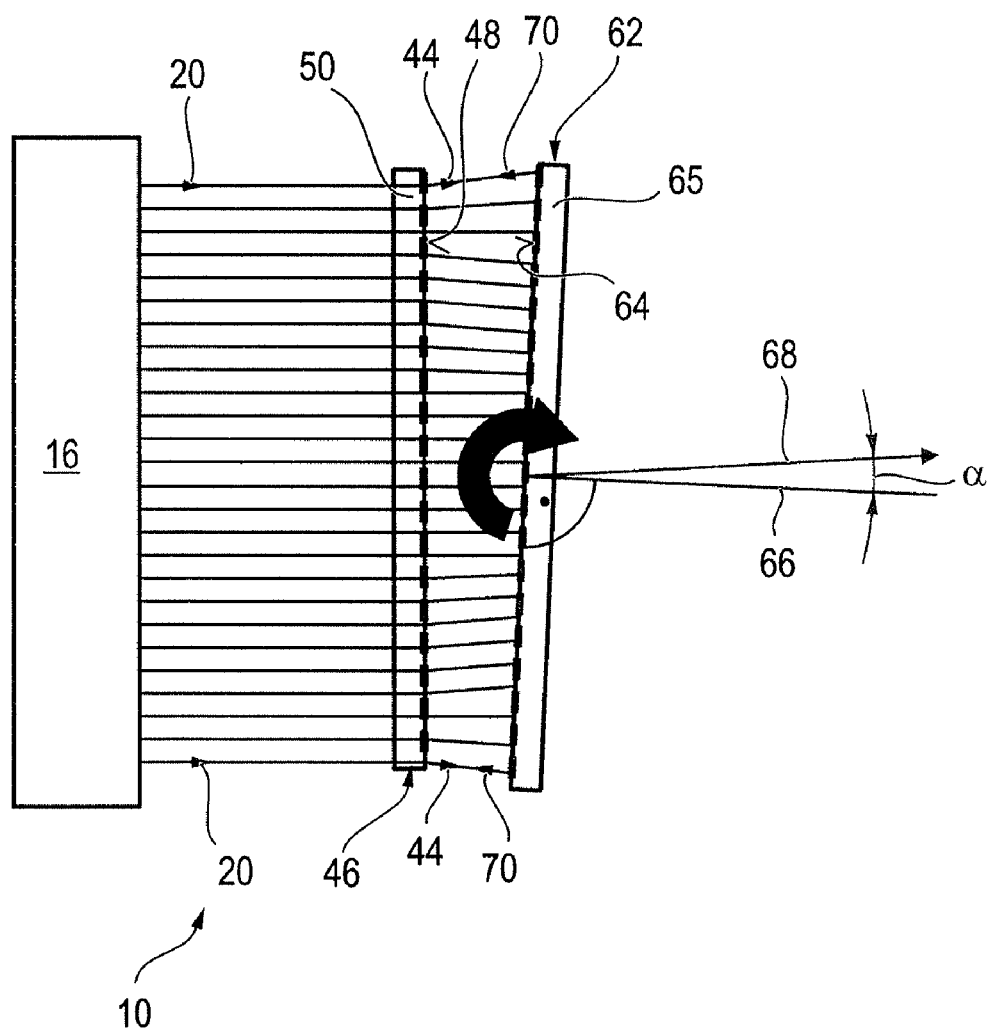
FIG. 2 illustrates the interferometric measuring apparatus of FIG. 1 together with a diffractive calibration device in an embodiment according to the invention used for performing a calibration method according to a first aspect of the invention.
Figure 3:
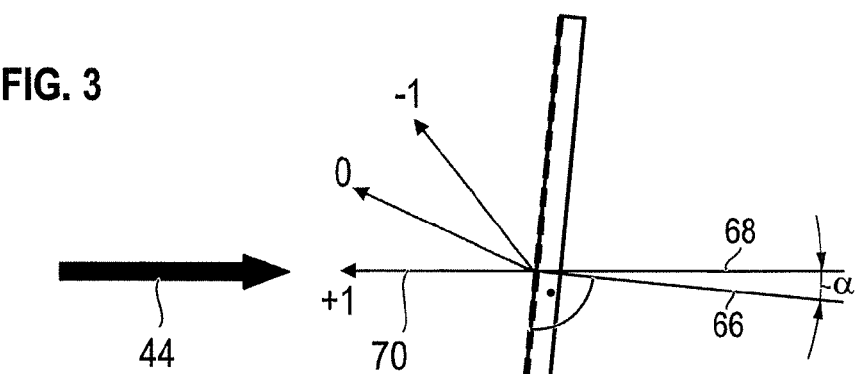
FIG. 3 illustrates an interaction of an adapted wave with the diffractive calibration device in the arrangement according to FIG. 2.

FIGS. 2 to 5 illustrate a calibration method according to a first aspect of the invention. FIG. 2 shows the measuring apparatus 10 of FIG. 1 together with a diffractive calibration device 62 in an embodiment according to the invention. The diffractive calibration device in FIG. 2 is arranged at the location, at which the test object 14 in FIG. 1 is arranged. The diffractive calibration device 62 is configured to simulate the optical test surface 12 of the target shape in order to perform a calibration method according to the invention. According to this calibration method the interferometric measuring apparatus 10 including the wave shaping device 46 is calibrated.

The diffractive calibration device 62 comprises a diffractive surface 64 in the form of a phase-CGH, which is arranged on a substrate 65. The diffractive surface 64 comprises a diffractive pattern. This diffractive pattern is configured such, that the adapted wave 44 is diffracted in reflection at the diffractive surface 64, wherein the diffracted wave, in the following referred to as calibration beam 70 or calibration wave, is in auto collimation with the adapted wave 44.

That means, the calibration beam runs in the same optical path as the adapted wave 44, only in the opposite direction. This type of reflection of the adapted wave 44 is also referred to as Littrow-reflection. In one embodiment according to the invention the calibration beam 70 is formed from the first diffraction order of the radiation of the adapted wave 44 diffracted in reflection. This situation is illustrated in detail in FIG. 3. The plus first diffraction order forming the calibration beam 40 has a distinct propagation direction, which is opposite to the propagation direction of the adapted wave 44.

In contrast to, for example, the use of a multiplexed CGH, with which several first diffraction orders having different propagation directions can be generated, and in which case a calibration beam formed from a certain diffraction order would not have a distinct propagation direction, the calibration beam 70 according to the first aspect of the invention thus has a distinct propagation direction. The calibration beam 70 can also be formed from a higher diffraction order, for example the third order diffraction of the incoming radiation of the adapted wave 44.

The diffractive pattern of the diffractive calibration device 62 is configured such, that the effect, which the diffractive pattern has on the adapted wave 44 upon generation of the calibration beam 70 corresponds to the effect a target shaped surface 12 has on the adapted wave 44 upon reflection of the adapted wave 44 on the target shaped surface 12 if arranged in the optical path of the adapted wave 44 instead of the diffractive calibration device 62.

In order to form the calibration beam 70 by Littrow-reflection on the diffraction pattern 67 as described above, the diffracted calibration device 62 is tilted, such that the surface normal 66 of the diffractive surface 64 deviates from an average propagation direction 68 of the adapted wave 44 by a tilt angle $\alpha$. The average propagation direction 68 can be parallel to the optical axis 32. In one embodiment, the tilt angle $\alpha$ is 2.7°.

Figure 4:
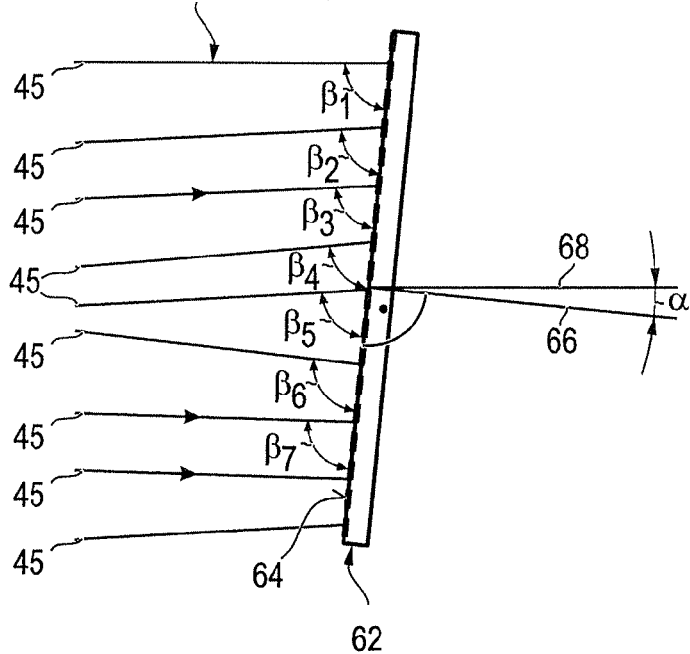
FIG. 4 illustrates the irradiation of the diffractive calibration device by the adapted wave while performing the calibration method according to an embodiment of the first aspect of the invention.
Figure 5:
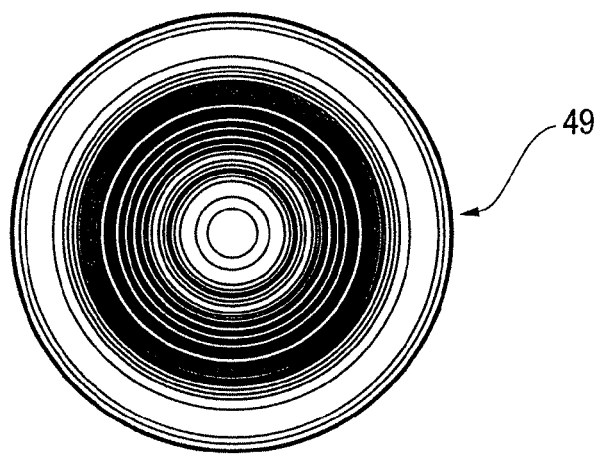
FIG. 5 shows an embodiment of a diffraction pattern of the wave shaping device of the measuring apparatus according to FIG. 1.

In the embodiment illustrated in FIG. 4 the tilt angle $\alpha$ is chosen such that no single ray 45 of the adapted wave 44 impinges on the diffractive surface 64 perpendicularly. Therefore, respective angles $\beta_i$, at which the single ray 45 hit the diffractive surface 64 are either larger than 90° or smaller than 90°, in particular larger than 90.5° and smaller than 89.5°, respectively.

In an embodiment according to the invention the adapted wave 44 is rotationally symmetric with respect to an axis of rotational symmetry, which corresponds in the shown embodiment to its average propagation direction 68. In a calibration method according to the invention using this diffractive calibration device 62, the diffractive calibration device 62 is mounted rotatably by a device holder not shown in the drawing. The device holder is rotatable around the axis of rotational symmetry 68 defined by the rotationally symmetric incident adapted wave 44. In the course of the calibration method the diffractive calibration device 62 is arranged in several different rotational positions with respect to the rotationally symmetric adapted wave 44, and an absolute calibration of rotationally non-symmetric errors is performed by analyzing the resulting calibration beam 70 for each of the different rotational positions.

As mentioned above, the diffractive pattern 67 of the diffractive calibration device 62 according to an embodiment is configured as a phase CGH, which is arranged on the substrate 65.

The method for calibrating the interferometric measuring apparatus 10 according to the above described first aspect of the invention as well as later described aspects of the invention is used as follows for manufacturing an optical element having for example an aspherical optical surface. First the diffractive calibration device 62 is arranged in the optical path of the adapted wave 44, as shown in FIG. 2 and a first interference image is recorded using the detector camera 58.

In case the interference image does not show any pattern, it can be followed, that the optical properties of the wave shaping device are optimally adapted to the target shape of the surface 12 of the optical element to be manufactured. In case line patterns occur in the interference image errors in optical components of the interferometric measuring apparatus, in particular errors in the wave shaping device 46 can be determined with high precision. Those errors are taken into account in a subsequent step, in which the actual surface 12 of the optical element to be manufactured is measured. The optical element is iteratively processed mechanically and measured using the interferometric measuring apparatus 10 in a way, in which deviations of the actual shape of the optical surface 12 from the target shape determined in the interferometric measurement are removed in a subsequent mechanical processing step. Subsequently, the result of the mechanical processing is verified again using the interferometric measuring apparatus 10.

The diffractive calibration device 62 and/or the wave shaping device 46 comprises in an embodiment according to the invention at least one diffractive monitoring structure on the respective diffractive surface 48 or 64. A pattern generated by the diffractive monitoring structure in the interference image recorded by the detector camera 58 is then analyzed to monitor a bending of the respective diffractive surface 48 or 64 during the calibration operation.

Figure 6:
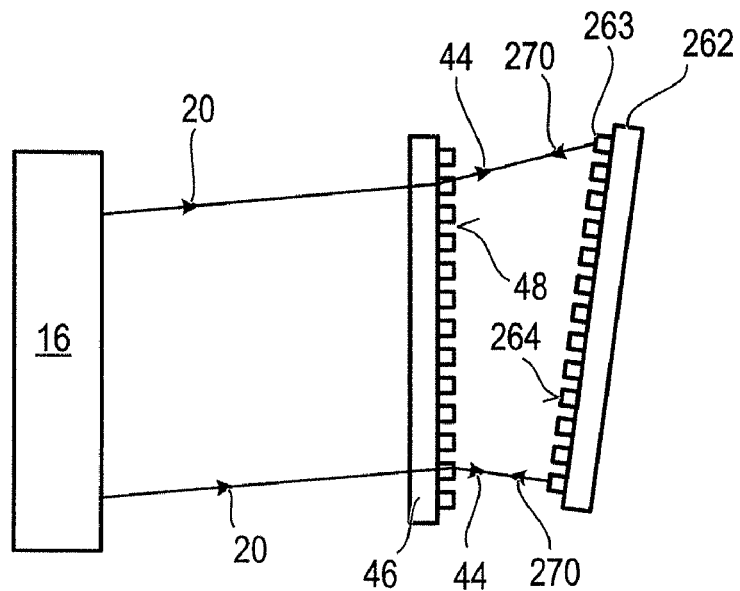
FIG. 6 shows the interferometric measuring apparatus of FIG. 1 together with a diffractive calibration device in an embodiment for performing a calibration method according to a second aspect of the invention.

FIGS. 6 to 10 illustrate a calibration method according to a second aspect of the invention. FIG. 6 shows the measuring apparatus 10 of FIG. 1 together with a diffractive calibration device 262 in a further embodiment according to the invention. The diffractive calibration device 262 is arranged at the location, at which the test object 14 in FIG. 1 is arranged, and comprises a diffractive surface 264.

Figure 7:
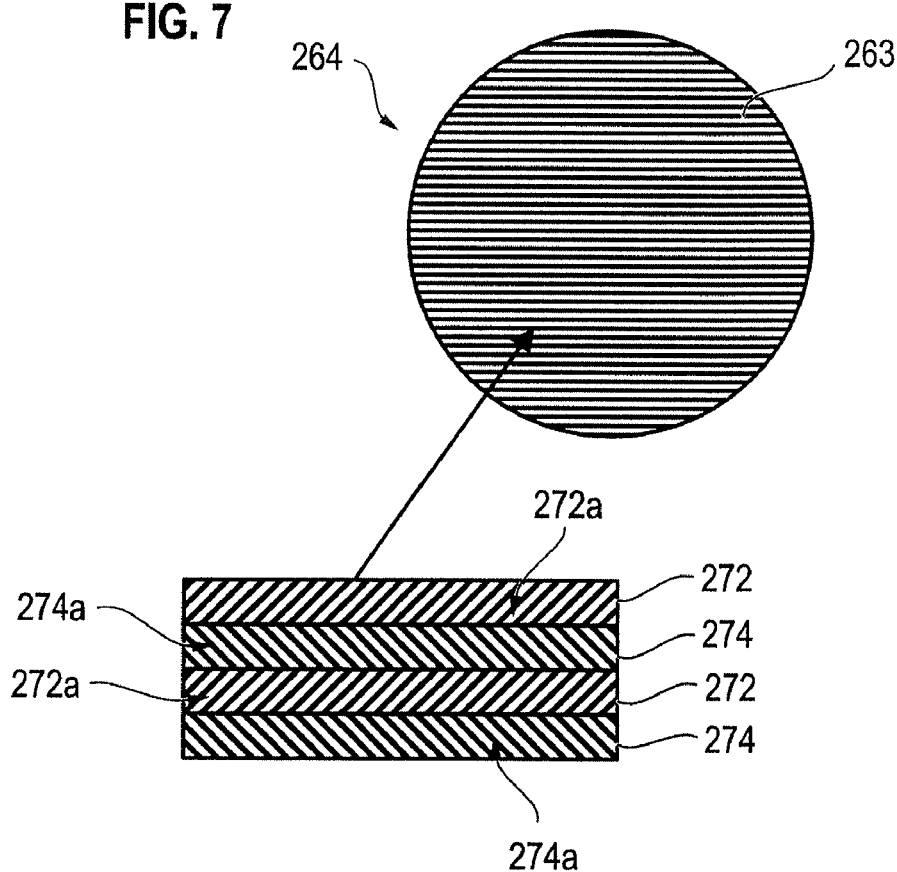
FIG. 7 shows a first embodiment of a diffractive surface of the diffractive calibration device according to FIG. 6.

A first variation of the diffractive surface 264 is shown in FIG. 7 in topdown view. This diffractive surface 264 comprises a diffractive calibration structure 263 in form of a dual-CGH (computer generated hologram). The diffractive calibration structure 263 is formed by first portions in form of first stripes 272 and second portions in form of second stripes 274, which first stripes 272 and second stripes 274 are arranged in alternating sequence. Each of the first stripes 272 comprises a first grating structure 272a forming a first phase function. The first phase function is designed to reflect the adapted wave 44 in a first diffraction mode, such that a calibration wave 270 is generated.

In the first diffraction mode the diffractive calibration device 262 simulates the optical test surface 12 of the target shape in order to perform a calibration method according to the invention. The first grating structures 272a are configured such, that the effect, which the diffractive calibration device 262 has on the adapted wave 44 upon generation of the calibration beam in the first diffraction mode corresponds to the effect a target shaped surface 12 has on the adapted wave 44 upon reflection of the adapted wave 44 on the target shaped surface 12 if arranged in the optical path of the adapted wave 44 instead of the diffractive calibration device 262.

Figure 9:
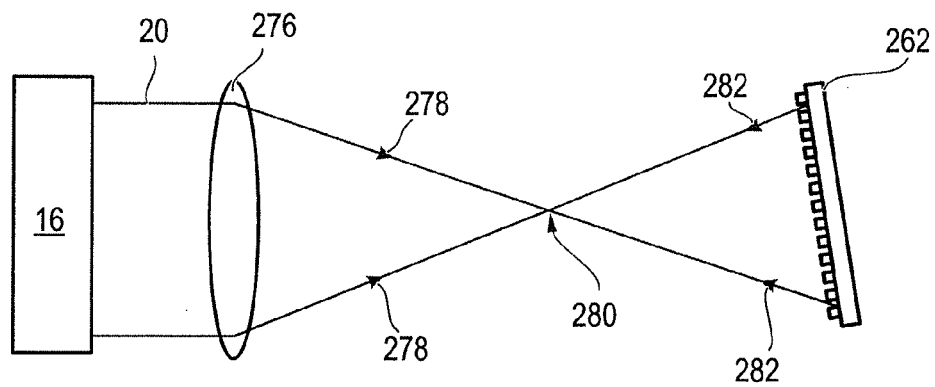
FIG. 9 shows the diffractive calibration device of FIG. 6 arranged in an extrafocal position with respect to an incoming spherical test wave during a calibration measurement of the diffractive calibration device.
Figure 10:
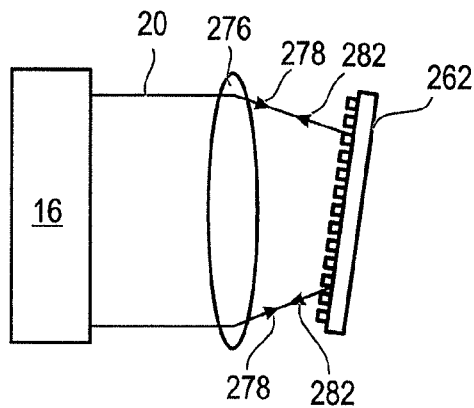
FIG. 10 shows the diffractive calibration device of FIG. 6 arranged in an intrafocal position with respect to an incoming spherical test wave during a calibration measurement of the diffractive calibration device.

Each of the second stripes 274 comprises a second grating structure 274a forming a second phase function. The second grating structures 274a are configured to retroreflect an incident spherical wave 278 into itself in a second diffraction mode. The second grating structures 274a are further provided with a tilt carrier such that the retroreflected spherical wave 282 and the calibration wave 270 are tilted relative to each other. FIGS. 9 and 10 illustrate a calibration routine of the diffractive calibration device 262 performed prior to calibrating the measuring apparatus 10 described above.

In this calibration routine a plane incoming wave 20 is transformed by a lens 276 into a spherical wave 278. The spherical wave 278 converges towards its focus 280. The diffractive calibration device 262 is subsequently arranged in an extrafocal position, as shown in FIG. 9, and an intrafocal position as shown in FIG. 10. In each of the positions the spherical wave 278 is retroreflected in itself in the second diffraction mode of the diffractive calibration device 262. The retroreflected spherical wave 282 generated thereby is analysed by the interferometer 16 for each position of the diffractive calibration device 262. Thereby a distortion of the diffractive calibration structure 263 with respect to a design configuration of the diffractive calibration structure 263 is determined. This way positional errors of the grid lines of the CGH constituting the diffractive calibration structure 263 are determined. Put in different words, the distortion of the diffractive calibration structure 263 is determined. This calibration routine is performed according to the routine described in U.S. Pat. No. 6,940,607 B2, which document is incorporated herein by reference.

After measurement of the distortion of the diffractive calibration structure 263 the measuring apparatus 10 including the wave shaping device 46 is calibrated in analogy to the calibration described above with respect to the first aspect of the invention. The wave shaping device 46 is irradiated with the incoming wave 20 to generate upon interaction of the incoming wave 20 with the diffractive wave shaping structure 49 an adapted wave 44 having a wavefront adapted to the target shape. Thereafter the calibration wave 270 is generated by reflecting the adapted wave 44 at the diffractive calibration structure 263 in the second diffraction mode. After this the calibration wave 270 is analyzed by the interferometer 16 to determine calibration errors of the measuring apparatus 10. Thereby the distortion of the diffractive calibration structure determined beforehand is taken into account. This can be done by determining the error contribution of the distortion to the error components of the measuring apparatus 10 and subtracting this error contribution from the determined error components.

Figure 8:
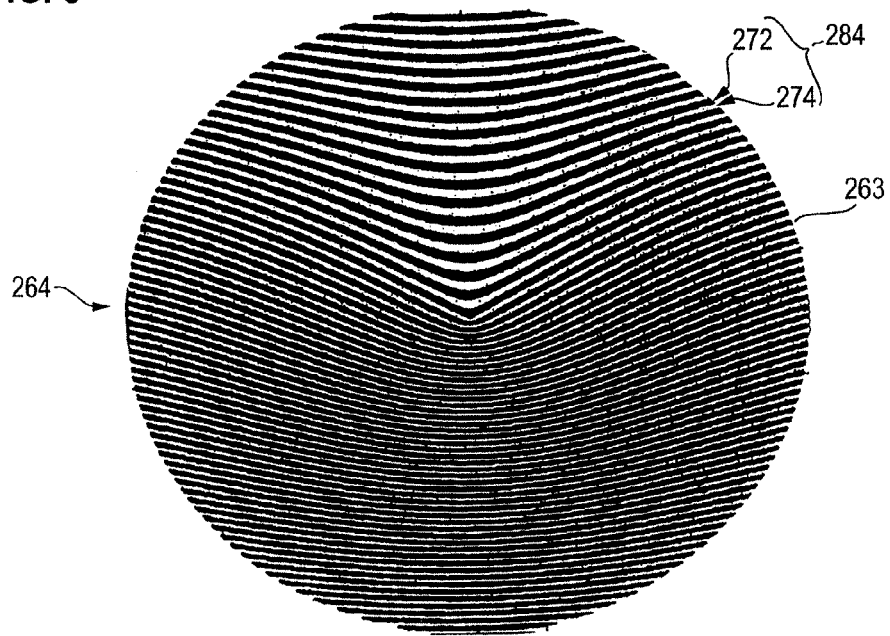
FIG. 8 shows a second embodiment of the diffractive surface of the diffractive calibration device according to FIG. 6.

FIG. 8 shows a second embodiment of the diffractive surface 264 of the diffractive calibration device 262 shown in FIG. 6, which can be used alternatively to the diffractive surface 264 shown in FIG. 7. The diffractive surface 264 according to FIG. 8 comprises a diffractive calibration structure 263 formed by first stripes 272 and second stripes 274 arranged in alternating sequence to form a super grating 284. For this purpose the stripes 272 and 274 are configured in a curved or bent shape and have variable width. The first stripes 272 each comprise a grating structure configured to form a first phase function. The super grating 284 formed by the stripes 272 and 274 is configured to form a second phase function.

The first phase function of the first stripes 272 is formed by a combination of a spherical phase sub-function and half of a given non-spherical phase sub-function coded with half of a tilt-carrier. The second phase function of the super grating 284 comprises half of the given non-spherical phase sub-function coded with half of the tilt carrier. The spherical phase sub-function has the function of reflecting the incident spherical wave 278 into itself as detailed above. The full non-spherical phase sub-function by itself has the above described function of diffracting the adapted wave 44 in reflection like an optical reference surface having the target shape.

By combining the wave diffracted by the first stripes 272 with the +1. diffraction order of the super grating 284 the spherical wave front can be generated, i.e. the diffractive calibration structure 263 operates in the first diffraction mode. By combining the wave diffracted by the first stripes 272 with the −1. diffraction order of the super grating 284 the calibration wave 270 can be generated, i.e. the diffractive calibration structure 263 operates in the second diffraction mode. The waves generated in the first and the second diffraction mode are further tilted to each other by the tilt carrier.

Figure 11:
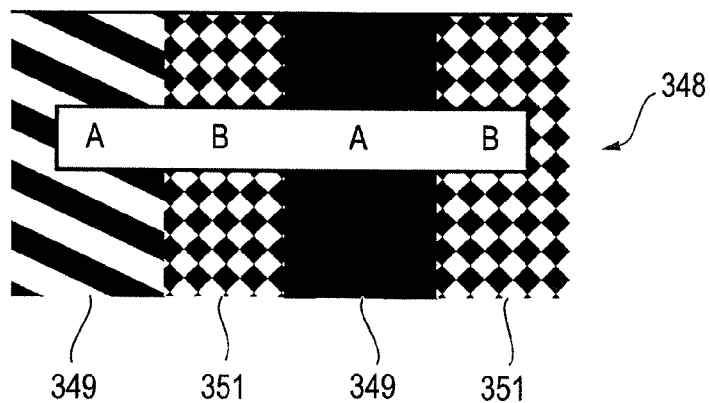
FIG. 11 shows a first configuration of a diffractive surface of a diffractive device used for performing a calibration method according to a third aspect of the invention.
Figure 12:
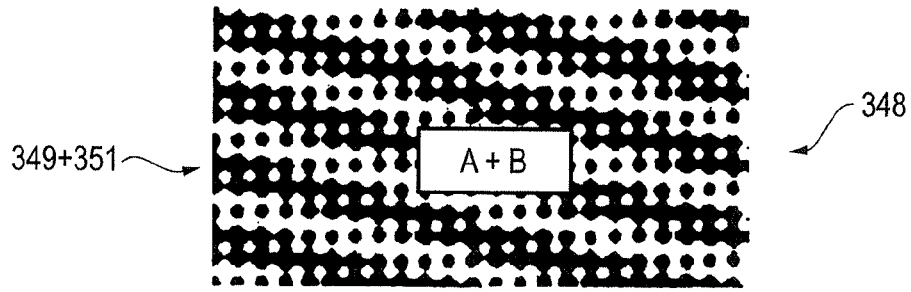
FIG. 12 shows a second configuration of a diffractive surface of a diffractive device used for performing the calibration method according to the third aspect of the invention.
Figure 13:
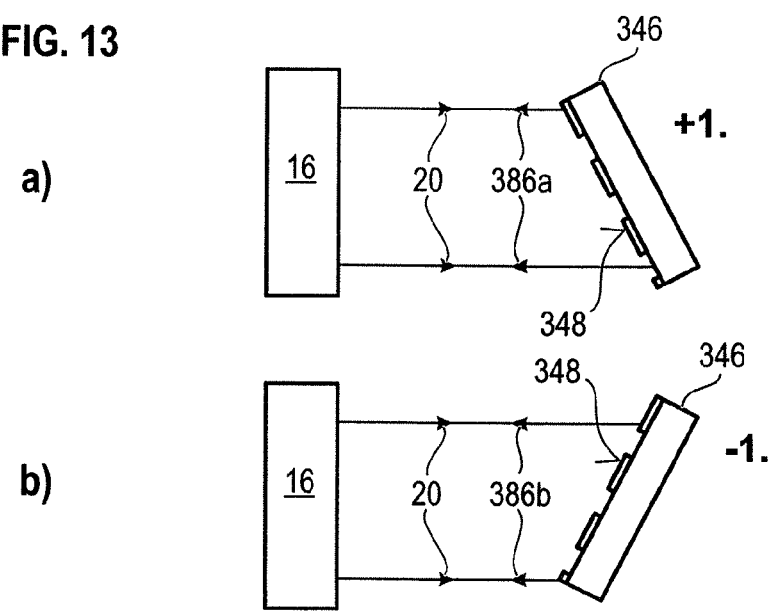
FIG. 13 shows the diffractive device in two rotational positions during the performance of the calibration method according to the third aspect of the invention.

FIGS. 11 to 13 illustrate a calibration method according to a third aspect of the invention. According to this aspect a diffractive device 346 is tested in order to determine positional errors of a diffractive main structure 349 arranged on the diffractive device 346 with respect to a design configuration of the diffractive main structure 349. The diffractive device 346 investigated this way can either be a diffractive wave shaping device of the type designated by the reference number 46 in FIG. 1 or a diffractive calibration device of the type designated by the reference number 262 in FIG. 6.

The positional errors of the diffractive main structure 349 determined by the calibration method according to the third aspect of the invention can define a distortion of the diffractive main structure 349 with respect to a design configuration of the diffractive wave shaping structure. The positional errors determined can also define a deviation of the profile of the diffractive main structure 349 from a design configuration of the profile.

In case a diffractive wave shaping device of the type shown in FIG. 1 and designated by reference number 46 is measured by the method according to the third aspect of the invention, the determined positional errors of the diffractive wave shaping structure 49 are taken into account when determining the calibration errors of the measuring apparatus 10 comprising the examined wave shaping device 46. A subsequent measurement of an optical test surface 12 using this measuring apparatus 10 is then corrected for by the determined positional errors of the diffractive wave shaping structure 49.

In case a diffractive calibration device of the type shown by reference numeral 262 in FIG. 6 is measured by the method according to the third aspect of the invention, the determined positional errors, like the distortion, of the diffractive calibration structure 263 are taken into account when analyzing a calibration wave 270 according to FIG. 6 for calibrating the measuring apparatus 10 including the wave shaping device 46.

As described above, the measuring apparatus 10 including the wave shaping device 46 is calibrated by irradiating the diffractive wave shaping structure 49 with an incoming wave 20 to generate upon interaction of the incoming wave 20 with the diffractive wave shaping structure 49 an adapted wave 44 having a wavefront adapted to a target shape of an optical test surface 12. The calibration wave 270 is thereafter generated by diffracting the adapted wave 44 at the diffractive calibration structure 264. The wavefront of the calibration wave 270 is then analyzed to determine calibration errors of the measuring apparatus. As positional errors of the diffractive calibration structure 263 like the distortion thereof, are known due to measurement using the calibration method according to the third aspect of the invention the determined calibration errors of the measuring apparatus can be corrected for accordingly.

For performing the calibration method according to the third aspect of the invention the diffractive device 346 comprises a diffractive surface 348 either according the embodiment shown in FIG. 11 or the embodiment shown in FIG. 12. In both embodiments the diffractive surface 348 comprises the diffractive main structure 349, which can either be the diffractive wave shaping structure 49 or the diffractive calibration structure 263, and a diffractive monitoring structure 351.

In the embodiment according to FIG. 11 the diffractive main structure 349 and the diffractive monitoring structure 351 are each configured as stripes, which are arranged in an alternating sequence. This type of arrangement can be referred to as sub-aperture coding of the diffractive surface 348. The diffractive main structure 349 is locally a periodic structure, wherein the diffractive monitoring structure 351 is configured as a checkerboard pattern. The periodicity of the checkerboard pattern is smaller than the smallest local periodicity of the diffractive main structure 349.

In the embodiment according to FIG. 12 the diffractive main structure 349 is combined with the checkerboard pattern of the diffractive monitoring structure 351 in form of a complexly coded hologram. In case of the embodiment according to FIG. 11 the diffractive monitoring structure 351 can be configured with varying stripe width and in the embodiment according to FIG. 12 varying weightings can be used for the diffractive monitoring structure 351.

The measurement of the positional errors of the diffractive main structure 349 is performed by arranging the diffractive device 346 in two different rotational positions shown under (a) and (b) of FIG. 13. Under (a) the diffractive device 346 is arranged in a first position, in which a plane incoming wave 20 generated by the interferometer 16 of the type shown in FIG. 1 is diffracted at the diffractive monitoring structure 351 such, that a plus first diffraction order 386a of diffracted calibration radiation is generated by retro-reflection of the incoming wave 20 at the diffractive monitoring structure 351. Therefore the calibration radiation 386a runs in the same beam path as the incoming wave 20. A first interference pattern generated by interference of the reference wave 40 with the calibration radiation 348a is recorded.

Subsequently, the diffractive device 346 is arranged in a second tilt position shown under (b) of FIG. 13. In this tilt position a minus first order 386b of the diffracted calibration radiation is generated in retro-reflection of the incoming wave 20. Therefore the calibration radiation 386b runs in the same beam path as the incoming wave 20. Also for this tilt position of the diffractive device 346 an interference pattern is recorded using the interferometer 16.

The interference patterns recorded for (a) and (b) are computationally processed. In one embodiment the interference patterns are subtracted from each other, which yields x-coordinates of a distortion of the diffractive main structure 349 with respect to its design configuration. Subsequently the diffractive device 346 is rotated by 90° and the measurements are repeated, resulting in y-coordinates of the distortion. This way distortion or grid errors of the diffractive main structure 349 are obtained and used for calibrating the measuring apparatus as described above. In one measurement cycle the distortion of the diffractive main structure 349 can be determined at 1000×1000 points. The measurement resolution is only limited by the resolution of the camera chip 54 of the interferometer 16.

In a further embodiment the interferograms obtained in the positions (a) and (b) of FIG. 13 are summed up allowing shape or profile errors of the diffractive surface 348 to be determined.

FIGS. 14 to 18 illustrate a calibration method of the measuring apparatus 10 according to a fourth aspect of the invention. This calibration method includes a determination of a scaling error of a diffractive main structure 449. As for example shown in FIG. 14, the diffractive main structure 449 extends over a diffractive surface 448 of a diffractive device 446. As in the calibration method according to the third aspect of the invention, the diffractive main structure 449 can be a diffractive wave shaping structure of the type designated by reference numeral 49 in FIG. 1 or the diffractive calibration structure 263 of the type designated by reference numeral 263 in FIG. 6.

As already detailed above, the term "scaling errors" in this context refers to a deviation in the scaling of the diffractive main structure 449 with respect to the scaling of a design configuration of the structure 449.

In the calibration method according to the fourth aspect of the invention the diffractive main structure 449 is qualified with respect to its scaling as described in the following. For this purpose monitoring elements 451 are arranged over at least a portion of a diffractive surface 448 covered by the diffractive main structure 449. The monitoring elements 451 are arranged periodically over at least a portion of the diffractive surface 448, such that the monitoring elements are in alignment with a two-dimensional grid.

Examples of the monitoring elements 451 and their arrangements are shown in FIGS. 17a to 17c and 18a to 18c. In the example shown in FIG. 17a, the monitoring elements 451 are lines of a linear diffractive grating 453. The diffractive grating advantageously extends over the entire diffractive surface 448 covered by the diffractive main structure 449. In FIG. 17b the monitoring elements 451 are lines of a diffractive cross grating 455 formed by two linear gratings oriented perpendicular to each other. It is possible to provide gap areas 457 in the arrangement of monitoring elements 451, as shown in FIG. 17c.

The monitoring elements 451 can also be configured as punctiform scattering structures as shown in FIGS. 18a to

18c. In the arrangement displayed in FIG. 18a the punctiform structures 451 are arranged periodically in two dimensions. Put in different words, the structures 451 are arranged at all grid points of a two dimensional grid. In the arrangement displayed in FIG. 18a gap areas 457 are left with no structures 451. FIG. 18c shows an arrangement of the punctiform structures 451, in which the structures 451 are arranged as in FIG. 18a at the grid points of a two dimensional grid except statistically chosen grid points, at which no structure 451 is arranged. By statistically omitting certain grid points the number of structures 451 is reduced without significantly changing the diffraction effect of the arrangement of structures 451 with respect to an incoming light wave. That means no additional diffraction orders are introduced if certain grid points are left out.

The monitoring elements 451 in any one of the above arrangements are printed together with the diffractive main structure 449 onto the substrate of the diffractive device 446. In case the magnification of the imaging lens of the printing system is not adjusted correctly, the scaling error affects the diffractive main structure 449 and the arrangement of the monitoring elements 451 the same way.

Figure 14:
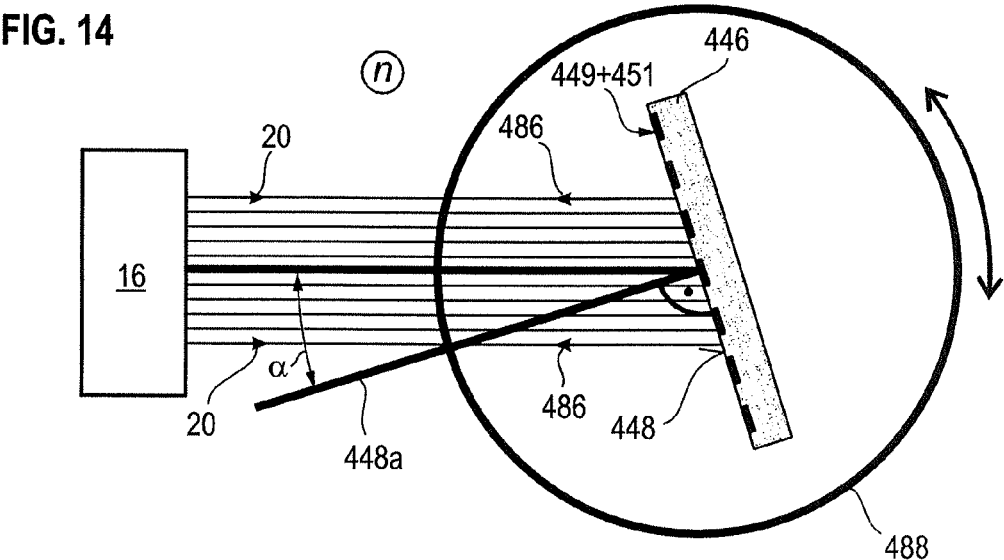
FIG. 14 shows an embodiment of an arrangement for measuring a scaling deviation of a diffractive device using a calibration method according to a fourth aspect of the invention.

The calibration method according to the third aspect of the invention measures the periodicity of the monitoring elements 451 and determines therefrom scaling errors of the diffractive main structure 449. For this purpose the diffractive device 446 is arranged on a rotating table 488 as shown in FIG. 14. A plane incoming wave 20 is produced by an interferometer 16 which can be configured as shown in FIG. 1 and directed onto the diffractive surface 448 of the diffractive device 446. Diffracted calibration radiation 486 is generated upon diffraction of the plane incoming wave 20 at the monitoring elements 451. The rotating table 488 is adjusted such that a given diffraction order m of the diffracted calibration radiation 486 is in autocollimation with the incoming wave 20, i.e. Littrow-reflection of the incoming wave occurs. The adjustment of the rotational position of the rotating table 488 is achieved by optimizing the interferogram generated on the detector 54 of the interferometer 16.

Figure 15:
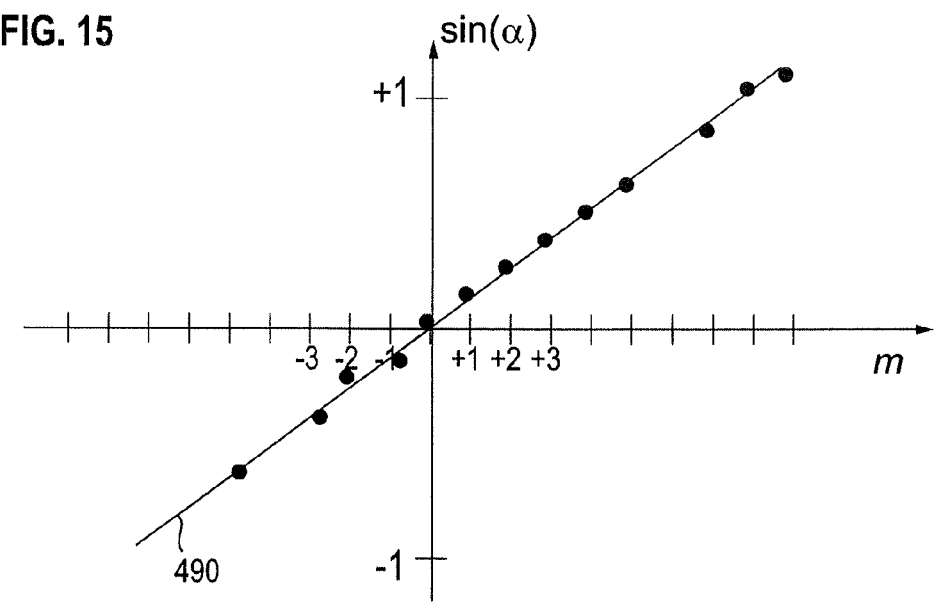
FIG. 15 shows a graph generated from measurements obtained by the arrangement of FIG. 14.

The tilt angle α of the surface normal 448a of the diffractive surface 448 with respect to the propagation direction of the incoming wave 20 is determined for the given diffraction order m. This procedure is repeated for a number of different diffraction orders m of the diffracted calibration radiation 486. The sine of the tilt angles α determined this way is plotted in a graph with respect to the respective diffraction order m as shown in FIG. 15. Subsequently, the gradient of the fitted straight line 490 of the plotted points in the graph is determined.

From the gradient and the wavelength λ of the incoming wave 20 the periodicity of the monitoring elements 451 on the diffractive surface 448 is determined. The periodicity of the monitoring elements 451 is compared to a design periodicity of the monitoring elements 451. The deviation in periodicity indicates the scaling error of the diffractive main structure 449 in one dimension of the diffractive surface 448. In order to obtain the scaling error in both dimensions the diffractive device 446 is rotated by 90° and the above procedure is repeated.

This way the diffractive device 446 is qualified with respect to the scaling error of the diffractive main structure 449 arranged thereon. As mentioned above the diffractive device 449 qualified this way can either be the wave shaping device 46 or the diffractive calibration device 262 used for calibrating the measuring apparatus 10 containing a wave shaping device 46. From the determined scaling errors of the diffractive device 446 calibration errors of the measuring apparatus 10 are determined in analogy to the procedure described above with respect to the third aspect of the invention, in which distortion errors of either a diffractive wave shaping device 46 or a diffractive calibration device 262 are used to determine calibration errors of the measuring apparatus 10.

Figure 16:
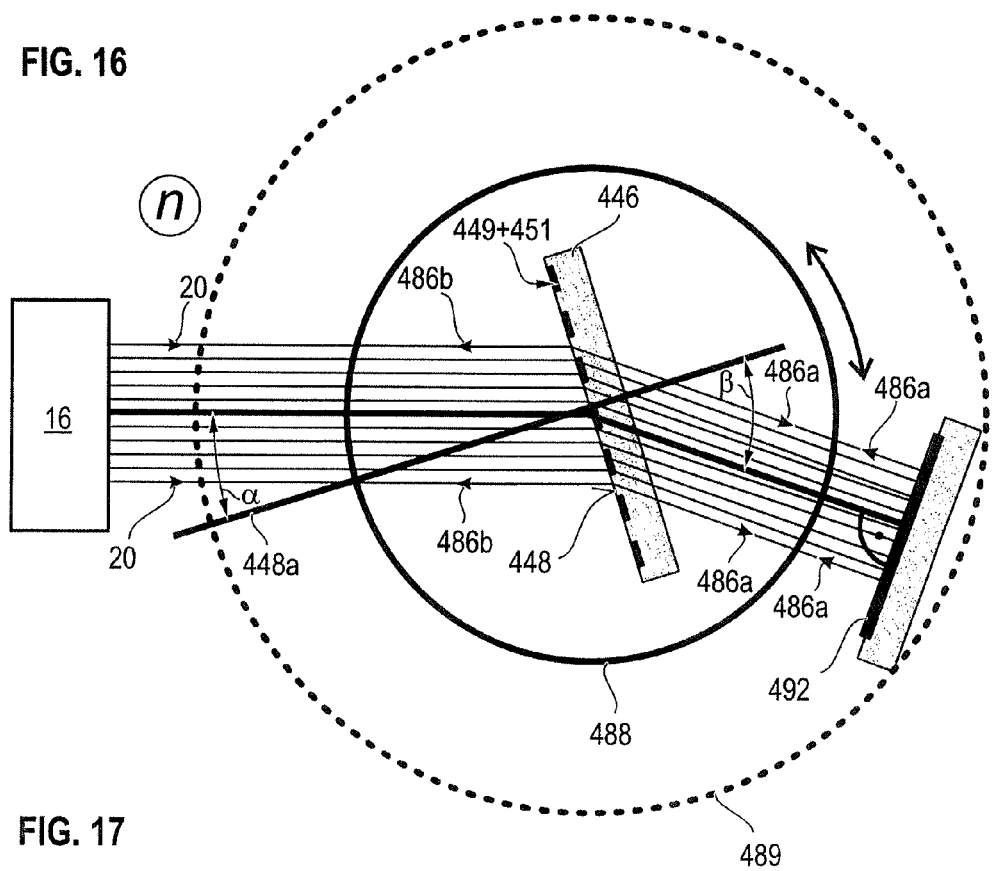
FIG. 16 shows a further embodiment of an arrangement for measuring a scaling deviation of a diffractive device using the calibration method according to the fourth aspect of the invention.
Figure 17:
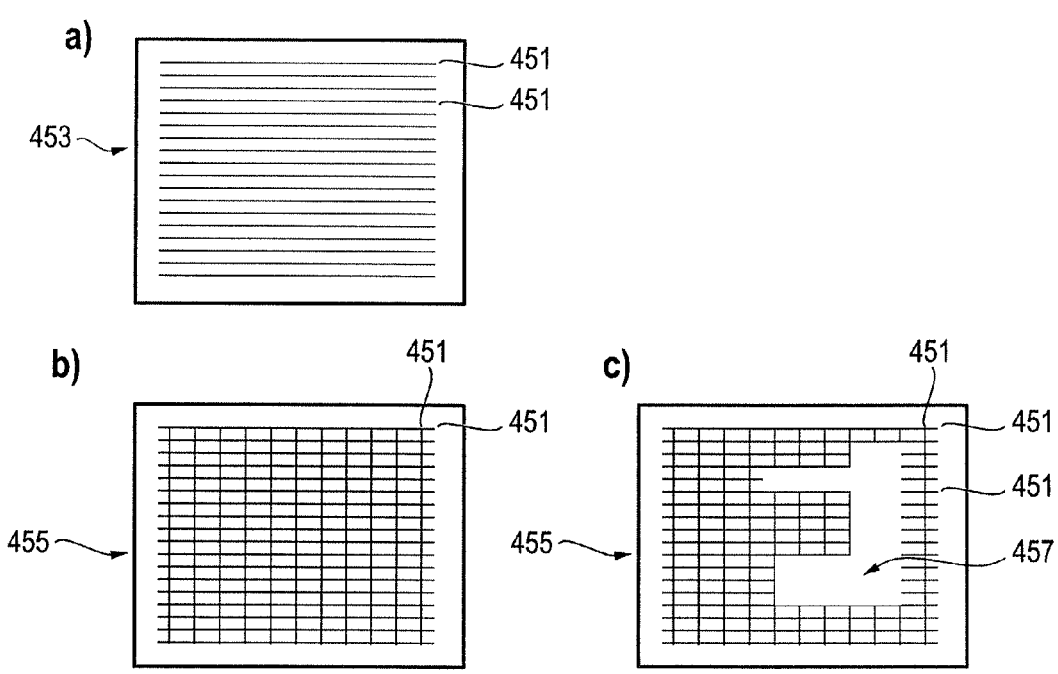
FIGS. 17a to 17c show different embodiments of monitoring elements forming a diffractive grating arranged on a diffractive surface of the diffractive device shown in FIGS. 14 and 16, FIGS. 18a to 18c show different embodiments of monitoring elements in the form of punctiform scattering structures on a diffractive surface of the diffractive device shown in FIGS. 14 and 16.
Figure 18:
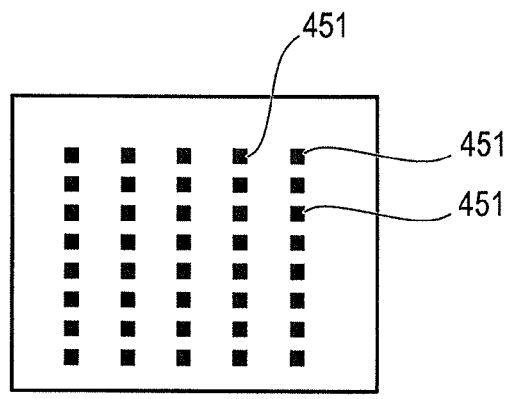
Figure 18:
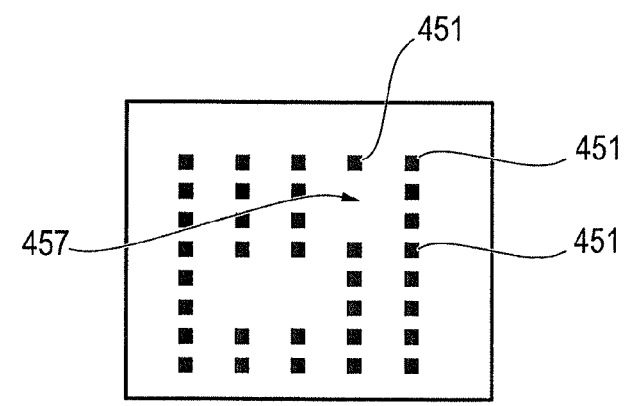
Figure 18:
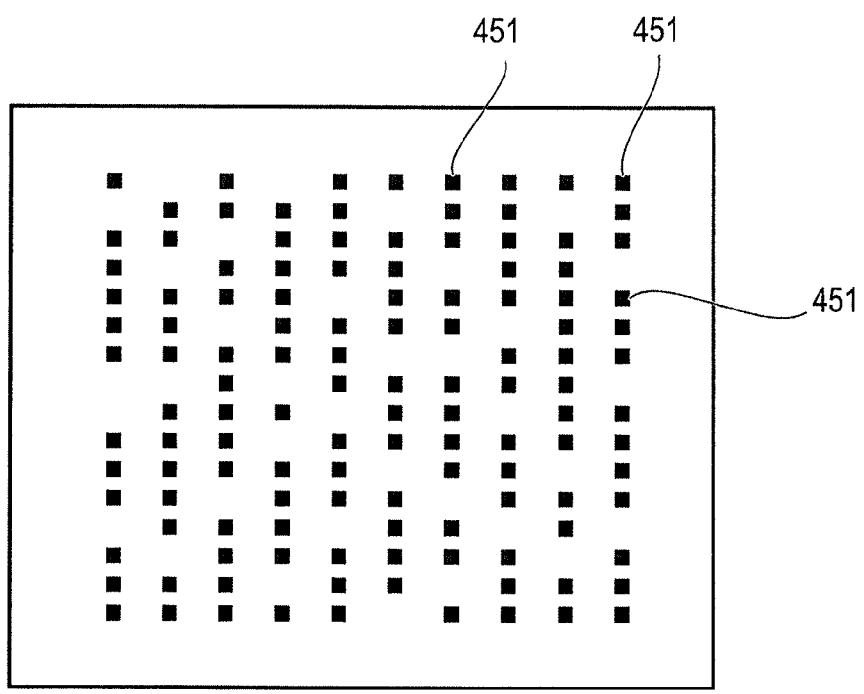

FIG. 16 shows an alternative embodiment of the measuring arrangement shown in FIG. 14. The measuring arrangement according to FIG. 16 is configured for qualifying the scaling errors of a diffractive device 446 in transmission. The incoming plane wave 20 is diffracted at the monitoring elements 451 in transmission to result into a given diffraction order m of diffracted calibration radiation 486a. A plane mirror 492 is arranged on a second rotating table 489 and adjusted in its rotational position such the diffracted calibration radiation 486a in the given diffraction order m is retroreflected into itself in autocollimation. The retroreflected radiation 486a is diffracted again at the monitoring elements 451 in transmission to result into the calibration radiation 486b. In analogy to the embodiment illustrated in FIG. 14 the tilt angle α of the diffractive device 446 is adjusted such that the calibration radiation 486b is in autocollimation with the incoming wave 20 at different diffraction orders.

FIGS. 19 to 23 illustrate optical elements 14, which can be manufactured using the calibration method according to the first, second, third or fourth aspect of the invention described above. A measuring apparatus 10 calibrated by one of the above calibration methods is capable of measuring deviations of the actual shape of the optical surface 12 of an optical element 14 with respect to the non-spherical target shape with such an accuracy that the optical surface 12 can be machined subsequently such that certain tolerances specified below can be met. These tolerances are not met by currently available optical elements.

The optical elements 14 can be lenses or mirrors used in a projection objective of a projection exposure tool for microlithography. In one embodiment the optical elements are mirrors coated with an EUV-reflecting material for assembly in a projection objective of an EUV-projection exposure tool.

Figure 19:
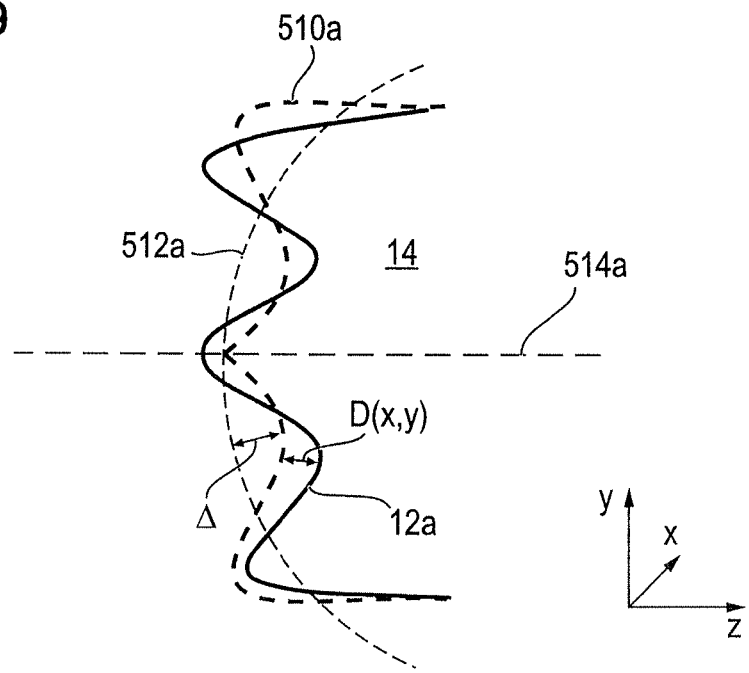
FIG. 19 depicts a cross-sectional view of a first embodiment of an optical element according to the invention having a rotationally symmetric aspherical surface.

FIG. 19 shows a cross sectional view of a first embodiment 12a of an optical surface of an optical element 14 manufactured according to the invention in the form of a convex mirror. The optical surface 12a is adapted to a non-spherical target shape 510a, which is configured in form of a rotationally symmetric asphere. The target shape 510a is rotationally symmetric with respect to a rotational axis of symmetry 514a, which typically also acts as a rotational axis of symmetry for a best fitting spherical surface 512a of the target shape 510a. The target shape 510a has a deviation Δ from its best fitting spherical surface 512a of at least 500 μm. That means the target shape 510a deviates from its best fitting spherical surface 512a at at least one location of the target shape 510a by at least 500 μm.

The target shape 510a may be represented by the following formula, which is known to the person skilled in the art as "asphere-equation":

$$z = \frac{cr^2}{1 + \sqrt{1-(1+k)c^2r^2}} + \alpha_1 r^2 + \alpha_2 r^4 + \alpha_4 r^8 + \alpha_5 r^{10} + \alpha_6 r^{12} + \alpha_8 r^{14}$$

In this equation z represents the z-coordinate of the surface of the target shape 510a at a distance r from the optical axis or axis of symmetry 514a, c is the curvature of the aspherical surface, k is the conic coefficient, and $\alpha_i$ are further coefficients. An exemplary embodiment of the target shape 510a is characterized by the following parameters for the above equation:

R=+668.5512 mm
$c=1/r=1.49577 \cdot 10^{-3}$ mm$^{-1}$
k=0
$\alpha_1=0$
$\alpha_2=-2.946315 \cdot 10^{-9}$ mm$^{-3}$
$\alpha_3=8.333468 \cdot 10^{-14}$ mm$^{-5}$
$\alpha_4=1.08029510 \cdot 10^{-17}$ mm$^{-7}$ Another example of an aspherical surface is contained in WO 2006/077145 A2 which document is hereby incorporated by reference.

Figure 20:
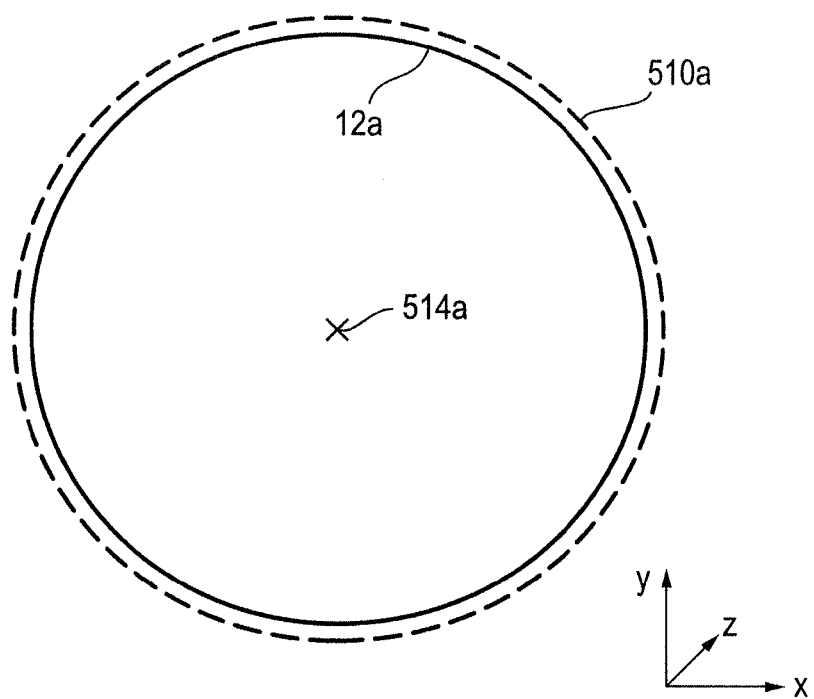
FIG. 20 depicts a topdown view of the optical element shown in FIG. 19.
Figure 21:
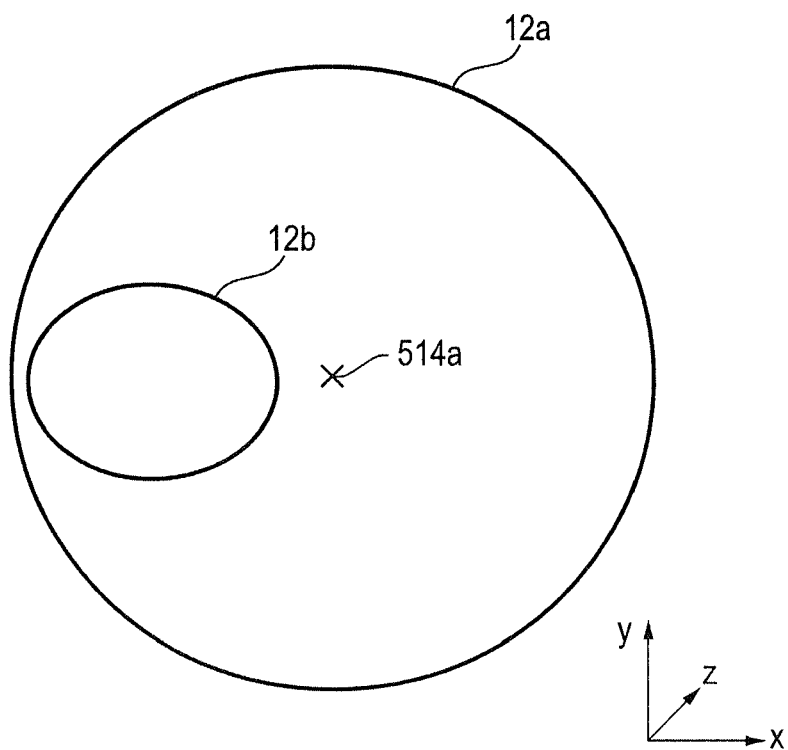
FIG. 21 illustrates a second embodiment of an optical element according to the invention in the form of an off-axis asphere in topdown view.

FIG. 20 shows a topdown view of the optical surface 12a according to FIG. 19 together with a perimeter of the target shape 12a. FIG. 21 illustrates a second embodiment 12b of an optical surface of an optical element 14 manufactured according to the invention. The optical surface 12b is a so-called "off-axis asphere" and is configured as an off-centered section of a rotationally symmetric aspherical surface. As an example for a rotationally symmetric aspherical surface the perimeter of the optical surface 12a of FIG. 20 is depicted in FIG. 21 for illustration purposes. The optical surface 12b is an off-centered area of the optical surface 12a. The target shape of the optical surface 12b, not shown in the drawings, also has a deviation from its best fitting spherical surface of at least 500 μm.

Figure 22:
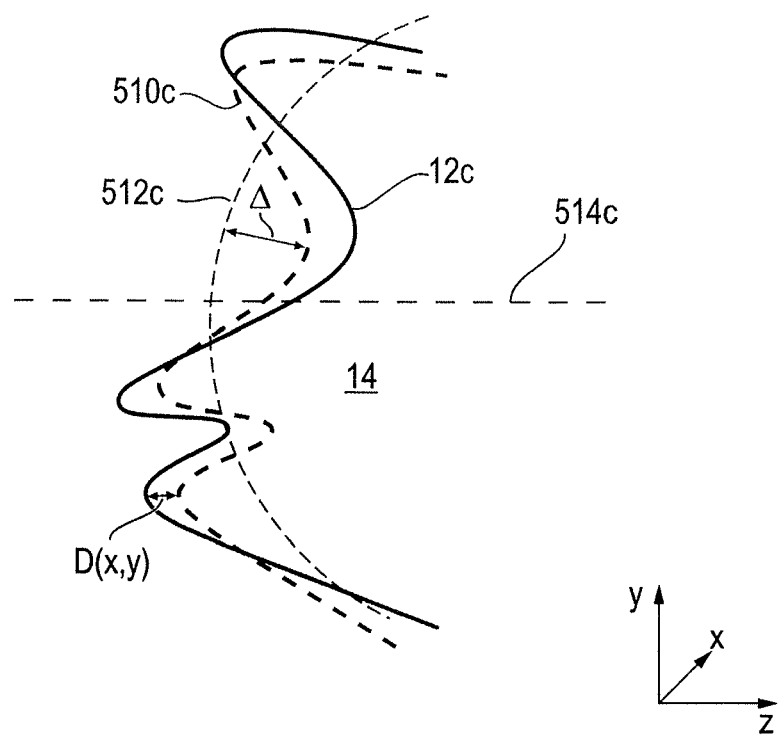
FIG. 22 depicts a cross-sectional view of a third embodiment of an optical element according to the invention having a free form surface.

FIG. 22 shows a cross sectional view of a third embodiment 12c of an optical surface of an optical element 14 manufactured according to the invention. The optical surface 12c is a so-called free form surface adapted to a target shape 510c of no rotational symmetry. FIG. 22 further shows the best fitting spherical surface 512c of the target shape 510c. For illustrative purposes the rotational axis 514c of the best fitting spherical surface 512c is shown in the drawing. The optical surface 12b has a deviation from its best fitting spherical surface 512 of at least 5 μm.

The target shape 510c may be represented by different mathematical functions, for example splines or simple xy-polynomials in the following form:

$$z = \sum_{n,m} a_{nm} x^n y^m$$

wherein z is the arrow height and n+m≦10 or ≦20. Such representations are supported by many optical design programs like Code V known to the person skilled in the art.

According to the invention an optical element 14, which can be of any of the types shown in FIGS. 19 to 22, is provided. This optical element 14 has an optical surface 12, which is adapted to the respective non-spherical target shape 510, such that a long wave variation of the actual shape of the optical surface with respect to the target shape is limited to a maximum value of 0.2 nm, wherein the long wave variation includes only oscillations having a spatial wavelength equal to or larger than a minimum spatial wavelength of 10 mm.

Figure 23:
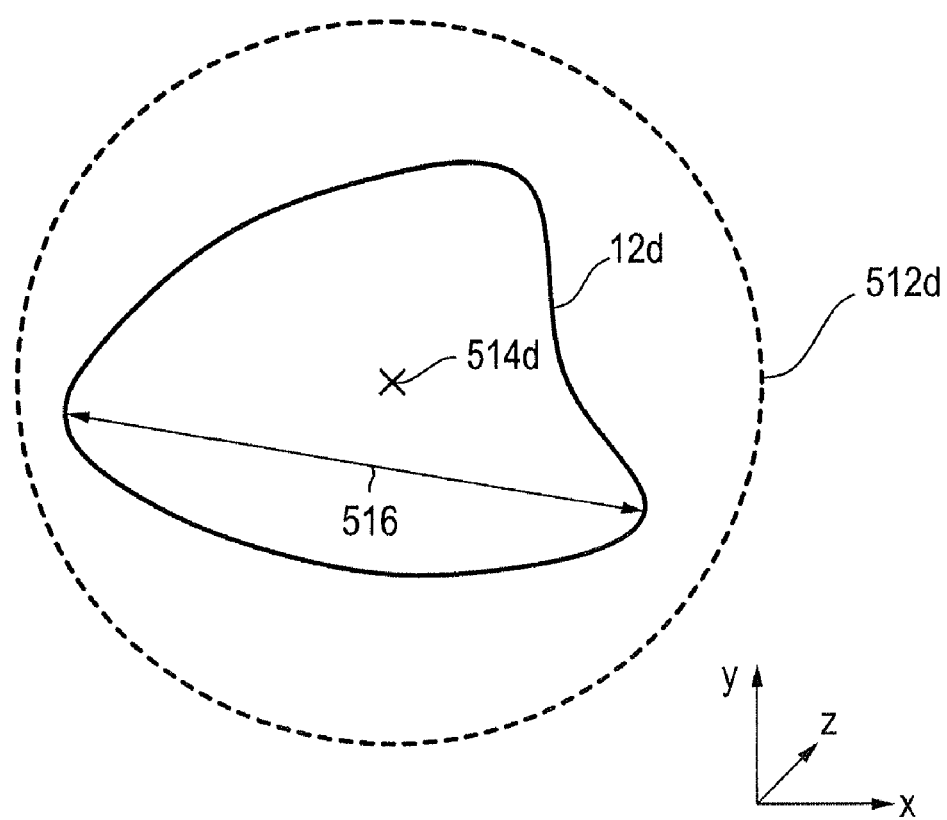
FIG. 23 illustrates a clear aperture of an asphere according to the invention.

In another embodiment the optical element 14 a best fitting spherical surface 512 of the target shape has a rotational axis of symmetry, for example axis 514a according to FIG. 19 or axis 514c according to FIG. 22, and the optical surface, an example of which is referred to by reference numeral 12d in the illustration of FIG. 23, has a clear aperture defined by the maximum diameter 516 of the optical surface 12d when viewed in direction of the rotational axis of symmetry 514d. As the optical surface 12d, as illustrated in FIG. 23 can be non-circular the term "maximum diameter" is to be understood as the longest possible chord within the perimeter of optical surface 12d. The optical surface 12d is configured such that a long wave variation of the actual shape of the optical surface with respect to the target shape is limited to a maximum value of 0.2 nm, wherein the long wave variation includes only oscillations having a spatial wavelength equal to or larger than a minimum spatial wavelength of one fifth of the clear aperture.

The optical element 14 can for example be manufactured by means of a measuring apparatus 10 calibrated by any one of the above mentioned calibration methods. The calibrated measuring apparatus 10 is used to determine portions of the optical element to be further processed during the manufacture of the optical element such that the above specifications are met.

As mentioned above the optical element 14 according to the invention is characterized by a long wave variation of the actual shape of its optical surface 12 with respect to the target shape 510 being limited to a maximum value of 0.2 nm. This long wave variation includes only oscillations having a spatial wavelength equal to or larger than a minimum spatial wavelength, which can be 10 mm or alternatively one fifth of the clear aperture.

The long wave variation is defined as follows: a deviation D(x, y) of the actual shape from the target shape is determined as a function of location (x, y) on the optical surface 12. The deviation D(x,y) at a given location $(x_0, y_0)$ is transferred from the spatial domain into the frequency domain by performing a Fourier transform resulting in the function d(v), wherein v is the frequency.

The minimum spatial wavelength $\lambda_{min}$, which is 10 mm in one embodiment according to the invention, is converted into a maximum frequency $v_{max}$ in the frequency domain. Subsequently the maximum amplitude of the function d(v) in the frequency region below the maximum frequency $v_{max}$ is determined. This amplitude value reflects the maximum amplitude at the location $(x_0, y_0)$ of the optical surface 12 and is therefore referred to as local amplitude $A_l$. Subsequently local amplitudes $A_l$ are determined for a number of locations on the optical surface 12.

For qualifying the optical element 14 according to the invention this maximum amplitude $A_{max}$ is the significant value to be compared with the tolerance value of 0.2 nm. According to one embodiment of the invention the long wave variation of the actual shape with respect to the target shape is defined by the largest local amplitude $A_l$, i.e. the largest maximum amplitude at any location of the optical surface 12. Therefore the long wave variation of the actual shape from the target shape 510 is defined as the largest amplitude of deviations of the actual shape from the target shape at any location of the optical surface 12 equal to or larger than the minimum spatial wavelength.

According to another embodiment the long wave variation of the actual shape 12 from the target 510 shape is defined by the RMS (root mean square) value of a number of local amplitudes $A_l$, especially the RMS of the local amplitudes $A_l$ at any location on the optical surface.

Figure 24:
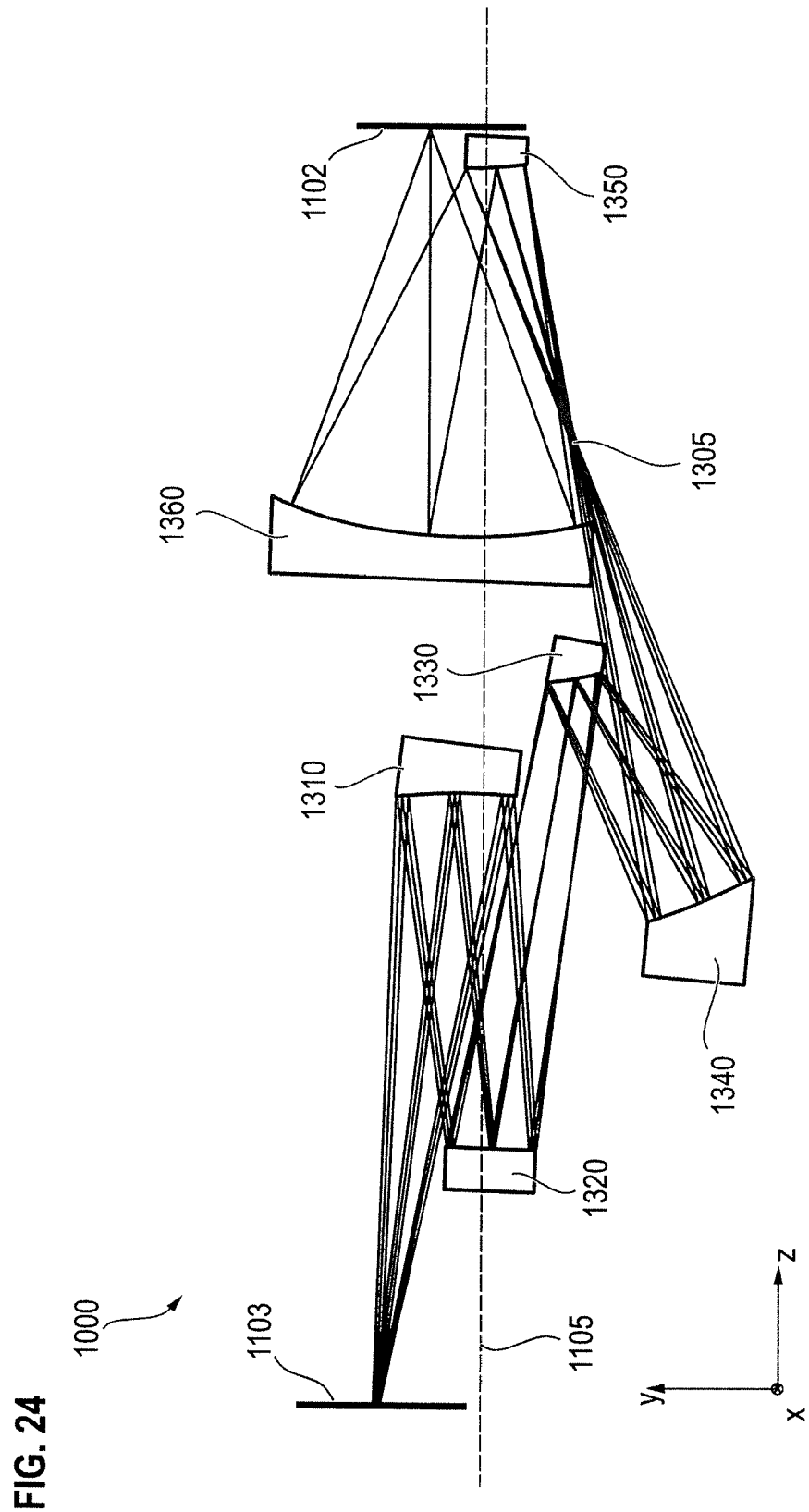
FIG. 24 shows a first embodiment of a projection objective including at least one optical element according to the invention.

FIG. 24 shows a first exemplary embodiment 1000 of a projection objective for a projection exposure tool operating with EUV-radiation. The projection objective 1000 according to FIG. 24 includes six rotationally-asymmetric mirrors 1310, 1320, 1330, 1340, 1350, and 1360. An optical element of the above described type according to the invention is used as at least one of these mirrors, which is manufactured, e.g. using one of the calibration methods of the invention.

The projection objective 1000 images EUV-radiation from an object plane 1103 to an image plane 1102 along a reference axis 1105. Data for the projection objective 1000 is presented Table 1A and Table 1B below. Table 1A presents optical data, while Table 1B presents rotationally-asymmetric constants for each of the mirror surfaces. For the purposes of Table 1A and Table 1B, the mirror designations correlate as follows: mirror 1 (M1) corresponds to mirror 1310; mirror 2 (M2) corresponds to mirror 1320; mirror 3 (M3) corresponds to mirror 1330; mirror 4 (M4) corresponds to mirror 1340; mirror 5 (M5) corresponds to mirror 1350; and mirror 6 (M6) corresponds to mirror 1360. "Spacing" in Table 1A refers to the distance between adjacent elements in the radiation path. The monomial coefficients $C_j$, for the rotationally-asymmetric mirrors, along with the amount the mirror is decentered and rotated from an initial projection objective design, are provided in Table 1B. R, the basic radius, is the inverse of the vertex curvature c. Decenter is given in mm and rotation is given in degrees. Units for the monomial coefficients are mm$^{-j+1}$. Nradius is a unitless scaling factor. In FIG. 24, the projection objective 1000 is shown in meridional section. The meridional plane is a symmetry plane for projection objective 1000. Symmetry about the meridional plane is as the mirrors are decentered only with respect to the y-axis and tilted about the x-axis. Further, the coefficients for the rotationally-asymmetric mirrors having an odd degree in the x-coordinate (e.g., x, $X^3$, $x^5$, etc.) are zero.

The projection objective 1000 is configured for operation with 13.5 nm radiation and has an image-side NA of 0.35 and a tracklength of 1,500 mm. The optical path length of imaged radiation is 3,833 mm. Accordingly, the ratio of optical path length to tracklength is approximately 2.56. The projection objective has a demagnification of 4×, a maximum distortion of less than 100 nm, $W_{rms}$ of 0.035λ, and a field curvature of 28 nm.

TABLE 1A

| Surface | Radius (mm) | Spacing (mm) | Mode |
|---|---|---|---|
| Object | INFINITY | 714.025 | |
| Mirror 1 | −1678.761 | −414.025 | REFL |
| Mirror 2 | 2754.233 | 564.025 | REFL |
| Mirror 3 | 350.451 | −316.293 | REFL |
| Mirror 4 | 590.379 | 906.948 | REFL |
| Mirror 5 | 433.060 | −435.447 | REFL |
| Mirror 6 | 521.283 | 480.767 | REFL |
| Image | INFINITY | 0.000 | |

TABLE 1B

| Coefficient | M1 | M2 | M3 | M4 | M5 | M6 |
|---|---|---|---|---|---|---|
| K | −4.724690E+00 | −9.830444E+01 | −3.914225E−01 | −8.227088E−01 | 7.162282E+00 | 9.391806E−02 |
| Y | 0.000000E+00 | 0.000000E+00 | 0.000000E+00 | 0.000000E+00 | 0.000000E+00 | 0.000000E+00 |
| $X^2$ | −1.641507E−04 | −1.736185E−04 | −2.373278E−04 | 2.451198E−05 | −1.557674E−04 | −6.667760E−06 |
| $Y^2$ | −1.752262E−04 | −1.741103E−04 | −9.708884E−04 | −3.130199E−05 | 1.398839E−04 | 9.098616E−06 |
| $X^2Y$ | −2.463783E−08 | −2.724028E−07 | 6.327587E−07 | −9.301810E−08 | 9.519017E−07 | −8.040311E−10 |
| $Y^3$ | −3.641831E−08 | −1.681535E−07 | −6.103587E−07 | 2.218271E−08 | 6.329282E−07 | −4.521618E−10 |
| $X_4$ | −1.405718E−10 | 1.314594E−09 | −1.671620E−08 | 4.569574E−10 | 7.852021E−10 | −5.450396E−11 |
| $X^2Y^2$ | −3.301633E−10 | 1.799995E−09 | 9.953323E−09 | −1.957005E−10 | 3.524719E−09 | −5.846553E−11 |
| $Y^4$ | 5.029041E−11 | 2.141266E−09 | 2.197236E−09 | 9.287687E−09 | 6.848802E−09 | −6.829886E−12 |
| $X^4Y$ | 2.090103E−13 | 4.363226E−12 | −5.435284E−11 | 1.915106E−13 | −2.016721E−11 | 5.660569E−15 |
| $X^2Y^3$ | −4.188774E−13 | 4.826497E−12 | 3.808642E−11 | −5.874603E−12 | −1.600920E−11 | −1.079542E−14 |
| $Y^5$ | −3.154428E−13 | −4.239647E−12 | −9.502949E−13 | 9.213338E−13 | 7.113886E−12 | −1.553415E−14 |
| $X^6$ | 1.150997E−16 | −5.978561E−15 | 1.819755E−13 | 1.113227E−15 | −7.841517E−14 | −1.105247E−16 |
| $X^4Y^2$ | −1.278596E−15 | −1.564797E−14 | −9.716106E−14 | 4.491475E−15 | 2.513948E−14 | −2.683146E−16 |
| $X^2Y^4$ | 4.862795E−15 | 2.347370E−14 | −8.086932E−14 | −1.357215E−14 | 7.550314E−13 | −1.006466E−16 |
| $Y^6$ | −2.281966E−15 | 6.013241E−15 | −9.790347E−15 | 9.777397E−16 | 5.013963E−13 | 2.221551E−17 |
| $X^6Y$ | 1.931804E−18 | −3.973144E−17 | 1.435292E−15 | 2.420914E−18 | 1.092143E−15 | 2.493748E−20 |
| $X^4Y^3$ | 1.873466E−17 | −2.704307E−16 | 6.491544E−16 | 1.627727E−18 | 4.414328E−15 | −3.302939E−21 |
| $X^2Y^5$ | −1.108422E−17 | −6.723973E−16 | 1.496578E−17 | −1.880319E−17 | 8.552963E−15 | −3.287503E−20 |
| $Y^7$ | 1.208226E−17 | −3.735956E−17 | 5.421342E−17 | −8.994976E−19 | 4.894980E−15 | −1.747517E−20 |
| $X^8$ | −6.860939E−22 | 3.733020E−20 | −1.370615E−17 | −3.978807E−21 | −1.975913E−18 | −3.966972E−22 |
| $X^6Y^2$ | −2.665919E−20 | −1.577571E−19 | 1.832427E−17 | −2.552872E−21 | −2.066761E−17 | −1.153602E−21 |
| $X^4Y^4$ | −1.606232E−19 | 9.112068E−19 | 3.422045E−18 | −4.011070E−20 | −4.034354E−17 | −9.786532E−22 |
| $X^2Y^6$ | −7.104780E−20 | 4.547933E−18 | 3.897160E−19 | 8.558317E−21 | 3.324806E−17 | −2.054121E−22 |
| $Y^8$ | −2.837115E−20 | 3.557864E−20 | −5.077104E−20 | 8.825661E−22 | 3.460507E−17 | 4.049399E−23 |
| $X^8Y$ | 1.837688E−23 | 1.087991E−21 | −7.892883E−20 | −4.154231E−23 | 3.418177E−20 | 2.593417E−25 |
| $X^6Y^3$ | 1.326930E−22 | 6.381757E−21 | 8.816591E−20 | −7.838712E−23 | −1.567137E−20 | 3.310704E−25 |
| $X^4Y^5$ | 5.956987E−22 | 3.566833E−20 | 3.431915E−21 | −1.727422E−20 | −2.315754E−19 | 1.062541E−25 |
| $X^2Y^7$ | 4.749865E−22 | −1.305899E−20 | −1.115108E−21 | 2.927898E−23 | 0.000000E+00 | 5.083980E−27 |
| $Y^9$ | 2.880675E−23 | 3.134161E−21 | 4.687247E−23 | −2.354646E−24 | 0.000000E+00 | −4.697062E−26 |
| $X^{10}$ | 3.263322E−27 | −1.350621E−25 | 7.223418E−23 | 3.596439E−27 | 0.000000E+00 | −1.214434E−27 |
| $X^8Y^2$ | −7.476461E−26 | −8.102951E−24 | −1.439645E−22 | −6.842489E−26 | 0.000000E+00 | −7.139344E−27 |
| $X^6Y^4$ | −2.162180E−25 | −1.982986E−23 | 1.317953E−22 | −1.079450E−25 | 0.000000E+00 | −8.881170E−27 |
| $X^4Y^6$ | −8.415305E−25 | −1.821358E−26 | −5.971700E−24 | −1.561940E−25 | 0.000000E+00 | −3.378805E−27 |
| $X^2Y^8$ | −8.228853E−25 | 3.745838E−24 | −3.016526E−24 | 3.289669E−26 | 0.000000E+00 | 1.400401E−27 |
| $Y^{10}$ | 2.644302E−26 | −1.118733E−23 | 5.389015E−25 | −3.012754E−27 | 0.000000E+00 | 9.011434E−28 |
| Nradius | 1.00E+00 | 1.00E+00 | 1.00E+00 | 1.00E+00 | 1.00E+00 | 1.00E+00 |
| Y-decenter | −100.000 | −84.186 | 100.000 | 19.008 | 11.570 | 24.216 |
| X-rotation | −7.020 | −1.728 | −11.272 | −5.323 | −2.295 | −1.825 |

For the mirrors in projection objective 1000, the maximum deviation of the rotationally-asymmetric surfaces from a corresponding spherical rotationally-symmetric reference surface for each mirror is as follows: 154 μm for mirror 310; 43 μm for mirror 320, 240 μm for mirror 330; 1,110 μm for mirror 340; 440 μm for mirror 350; and 712 μm for mirror 360. The maximum deviation of the rotationally-asymmetric surfaces from a corresponding aspherical rotationally-symmetric reference surface is 47 μm for mirror 310; 33 μm for mirror 320, 96 µm for mirror 330; 35 µm for mirror 340; 152 µm for mirror 350; and 180 µm for mirror 360.

The first and second mean curvature for mirror 310 are $9.51 \times 10^{-4}$ and $9.30 \times 10^{-4}$ respectively. Respective first and second mean curvatures for the other mirrors in the projection objective 1000 are as follows: $2.76 \times 10^{-5}$ and $1.56 \times 10^{-5}$ for mirror 1320; $-2.38 \times 10^{-3}$ and $-2.17 \times 10^{-3}$ for mirror 1330; $1.79 \times 10^{-3}$ and $1.75 \times 10^{-3}$ for mirror 1340; $-2.64 \times 10^{-3}$ and $-2.10 \times 10^{-3}$ for mirror 1350; and $1.93 \times 10^{-3}$ and $1.91 \times 10^{-3}$ for mirror 1360. The sum of the first mean curvature for projection objective 1000 is $-3.19 \times 10^{-4}$. The sum of the second mean curvature is $3.29 \times 10^{-4}$. The sum of the first and second mean curvatures is $9.97 \times 10^{-6}$ and the inverse sum of the first and second mean curvatures is $1.00 \times 10^{-5}$.

The projection objective 1000 images radiation from object plane 1103 to an intermediate image at a location 1305 near mirror 1360. Embodiments that have one or more intermediate images, also include two or more pupil planes. In some embodiments, at least one of these pupil planes is physically accessible for the purposes of placing an aperture stop substantially at that pupil plane. An aperture stop is used to define the size of the projection objective's aperture.

Figure 25:
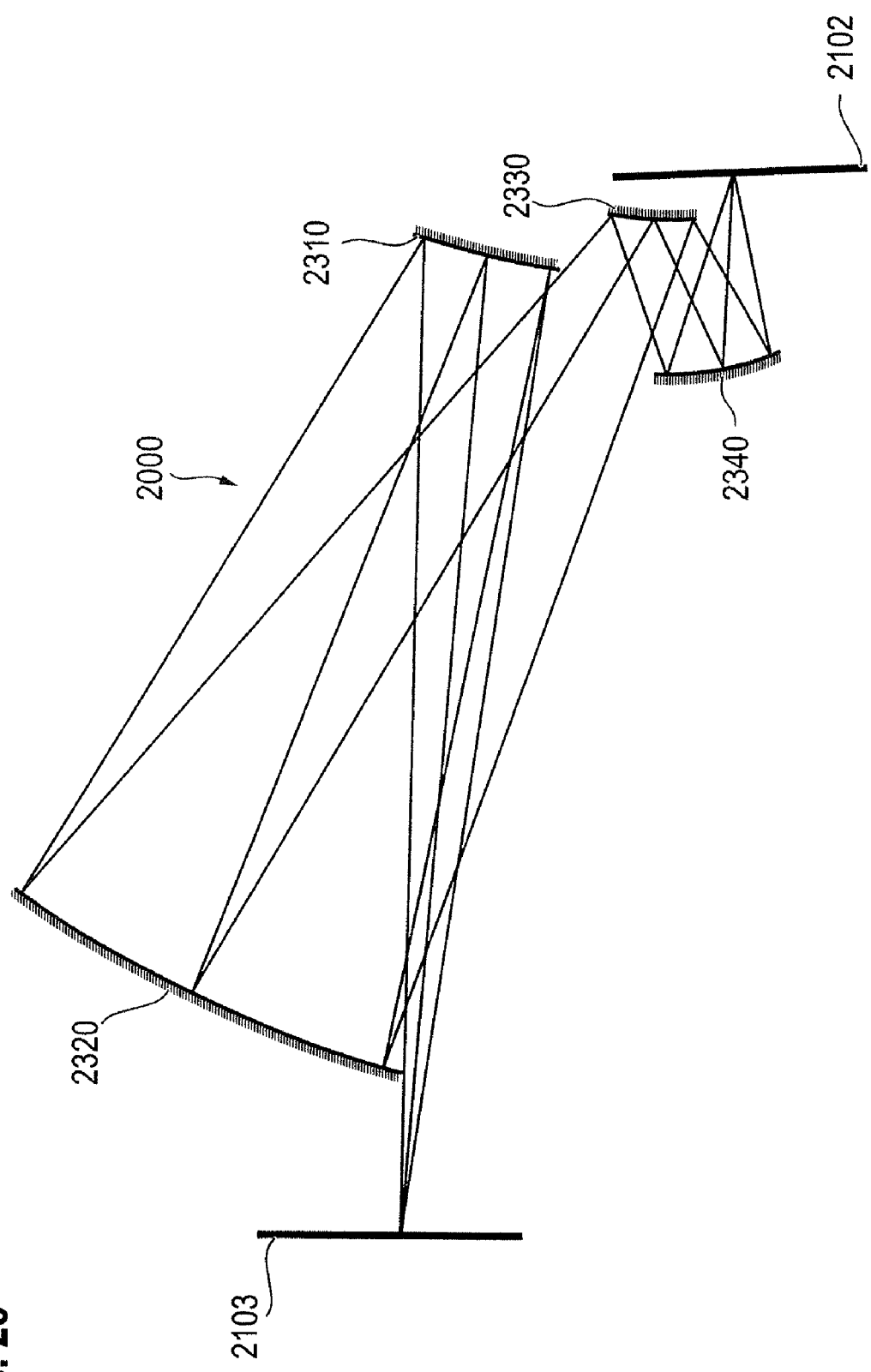
FIG. 25 shows a second embodiment of a projection objective including at least one optical element according to the invention.

FIG. 25 shows a second exemplary embodiment of a projection objective 2000 for an projection exposure tool operating with EUV-radiation. The projection objective 2000 includes four rotationally-asymmetric mirrors 2310, 2320, 1230, and 2340, which direct radiation from an object plane 2103 to an image plane 2102. An optical element of the above described type according to the invention is used as at least one of these mirrors, which is manufactured, e.g. using one of the calibration methods of the invention. The projection objective 2000 images radiation from an object plane 2103 to an image plane 2102 with a demagnification ratio of 4×.

The projection objective 2000 has an image-side NA of 0.26 and has a rectangular field. The height and width of the field at object plane 2102 is 8 mm and 100 mm, respectively. The tracklength of the projection objective 2000 is 2,360 mm. The image plane 2102 is tilted with respect to object plane 2103 by $-3.84°$.

Data for projection objective 2000 is presented in Tables 2A, 2B, 2C, and 2D below. Table 2A presents optical data, Tables 2B and 2C present rotationally-asymmetric constants for each of the mirror surfaces. For the purposes of Tables 2A-2D, the mirror designations correlate as follows: mirror 1 (M1) corresponds to mirror 2310; mirror 2 (M2) corresponds to mirror 2320; mirror 3 (M3) corresponds to mirror 2330; and mirror 4 (M4) corresponds to mirror 2340.

TABLE 2A

| Surface | Radius | Spacing | Mode |
|---|---|---|---|
| Object | INFINITY | 2102.043 | |
| Mirror 1 | 3004.821 | −1812.311 | REFL |
| Mirror 2 | 2545.365 | 1957.316 | REFL |
| Mirror 3 | 706.710 | 0.000 | REFL |
| STOP | INFINITY | −339.990 | |
| Mirror 4 | 741.656 | 453.302 | REFL |
| Image | INFINITY | 0.000 | |

TABLE 2B

| Coefficient | M1 | M2 | M3 | M4 | Image |
|---|---|---|---|---|---|
| Y-decenter | −65.523 | 54.692 | 48.905 | 47.778 | 23.755 |
| X-rotation | −2.620 | −2.374 | −2.706 | −1.585 | −3.084 |

With respect to Table 2D, $x_{Object/mm}$ and $y_{Object/mm}$ denote the x- and y-coordinates in the object plane. The values Distortion(x)/nm and Distortion(y)/nm denote the distortion at the respective coordinate. Absolute Value of Distortion/nm denotes the absolute distortion value at the respective coordinate. Telecentricity/Degrees denotes the chief ray angle at the respective coordinate. Wavefront Error at 13.5 nm denotes the RMS wavefront error in units of the illumination wavelength $\lambda = 13.5$ nm. As the optical system is mirror symmetric with respect to the yz-plane it is sufficient to give data for fieldpoints having positive x-coordinates in the object plane.

TABLE 2C

| Coefficient | M1 | M2 | M3 | M4 |
|---|---|---|---|---|
| K | −1.09E+00 | 5.80E+02 | 2.06E+00 | 6.72E−01 |
| Y | 0.00E+00 | 0.00E+00 | 0.00E+00 | 0.00E+00 |
| $X^2$ | 3.54E−04 | 9.93E−06 | −5.35E−04 | 1.23E−04 |
| $Y^2$ | 1.97E−04 | 1.07E−05 | 1.23E−05 | 2.97E−04 |
| $X^2Y$ | −6.42E−07 | −2.47E−08 | −4.37E−07 | −2.44E−07 |
| $Y^3$ | 3.69E−07 | 1.89E−08 | −1.34E−06 | −4.72E−07 |
| $X^4$ | 2.63E−09 | 3.01E−12 | −2.94E−08 | −5.08E−09 |
| $X^2Y^2$ | −1.09E−10 | 2.13E−11 | −3.33E−08 | −5.07E−09 |
| $Y^4$ | −6.07E−11 | −1.88E−11 | −1.42E−08 | −1.36E−09 |
| $X^4Y$ | −2.66E−11 | −7.36E−14 | 4.84E−11 | −4.80E−12 |
| $X^2Y^3$ | 2.61E−11 | 3.55E−14 | −5.06E−11 | −1.05E−11 |
| $Y^5$ | −1.67E−12 | −6.53E−15 | 7.86E−11 | −1.06E−11 |
| $X^6$ | −8.14E−13 | −2.93E−16 | −7.71E−13 | −1.04E−13 |
| $X^4Y^2$ | 1.29E−13 | 6.33E−17 | −1.53E−12 | −4.13E−13 |
| $X^2Y^4$ | −4.50E−14 | −7.40E−17 | 2.40E−13 | −3.31E−13 |
| $Y^6$ | 1.04E−15 | 1.42E−17 | −6.88E−13 | 1.99E−14 |
| $X^6Y$ | 1.96E−14 | 3.20E−18 | −6.34E−15 | −1.31E−15 |
| $X^4Y^3$ | −2.85E−16 | 2.38E−19 | −1.30E−14 | −5.72E−15 |
| $X^2Y^5$ | −1.60E−16 | −4.36E−20 | 1.43E−14 | −9.75E−16 |
| $Y^7$ | 1.93E−18 | 1.20E−20 | 1.61E−15 | 2.08E−15 |
| $X^8$ | −1.62E−17 | −1.41E−21 | −8.44E−19 | −7.70E−18 |
| $X^6Y^2$ | −1.69E−16 | −1.19E−20 | 1.72E−16 | −1.13E−16 |
| $X^4Y^4$ | 3.10E−18 | 5.44E−22 | 2.91E−16 | −1.26E−16 |
| $X^2Y^6$ | −2.80E−19 | 8.10E−22 | 9.83E−18 | 4.36E−17 |
| $Y^8$ | 8.73E−21 | −4.31E−24 | 4.37E−17 | 3.31E−17 |
| $X^8Y$ | 1.79E−19 | 6.79E−24 | 1.76E−18 | −4.84E−19 |
| $X^6Y^3$ | 6.22E−19 | 1.62E−23 | 6.22E−18 | −2.33E−18 |
| $X^4Y^5$ | −2.21E−20 | −3.41E−24 | −1.22E−19 | −1.19E−18 |
| $X^2Y^7$ | 4.10E−21 | −2.28E−24 | −2.47E−18 | 5.49E−19 |
| $Y^9$ | 9.75E−23 | −5.21E−26 | −5.68E−19 | 2.75E−19 |
| $X^{10}$ | −3.29E−23 | −8.73E−28 | −5.00E−21 | −4.71E−22 |
| $X^8Y^2$ | −4.75E−22 | −7.40E−27 | −6.76E−20 | −6.64E−21 |
| $X^6Y^4$ | −8.19E−22 | −6.01E−27 | −1.52E−19 | −1.46E−20 |
| $X^4Y^6$ | 4.25E−23 | 3.34E−27 | −4.79E−20 | −4.03E−21 |
| $X^2Y^8$ | −6.29E−24 | 2.20E−27 | 5.65E−21 | 1.87E−21 |
| $Y^{10}$ | −3.17E−25 | 9.18E−29 | 2.89E−21 | 8.49E−22 |
| Nradius | 3.00E+00 | 3.00E+00 | 3.00E+00 | 3.00E+00 |

TABLE 2D

| $x_{Object/mm}$ | $y_{Object/mm}$ | Distortion (x)/nm | Distortion (y)/nm | Absolute Value of Distortion/nm | Telecentricity/ Degrees | Wavefront Error at 13.5 nm |
|---|---|---|---|---|---|---|
| 0 | 600 | 0 | −0.960073 | 0.960073 | 0.0196465 | 0.027195 |
| 0 | 602 | 0 | −1.46082 | 1.46082 | 0.0111602 | 0.019766 |
| 0 | 604 | 0 | −1.14157 | 1.14157 | 0.00258716 | 0.015522 |

TABLE 2D-continued

| $x_{Object}/mm$ | $y_{Object}/mm$ | Distortion (x)/nm | Distortion (y)/nm | Absolute Value of Distortion/nm | Telecentricity/ Degrees | Wavefront Error at 13.5 nm |
|---|---|---|---|---|---|---|
| 0 | 606 | 0 | −0.708422 | 0.708422 | 0.00607316 | 0.01395 |
| 0 | 608 | 0 | −0.868087 | 0.868087 | 0.0148213 | 0.032279 |
| 12.5 | 600 | −0.702813 | −0.349919 | 0.785105 | 0.0226563 | 0.026075 |
| 12.5 | 602 | −0.506161 | −0.815296 | 0.959639 | 0.0159931 | 0.018251 |
| 12.5 | 604 | −0.214821 | −0.491402 | 0.536306 | 0.011916 | 0.01476 |
| 12.5 | 606 | 0.161171 | −0.084304 | 0.181888 | 0.0132822 | 0.014764 |
| 12.5 | 608 | 0.611783 | −0.300692 | 0.681685 | 0.0190686 | 0.032953 |
| 25 | 600 | −0.828473 | 0.99838 | 1.29736 | 0.0299227 | 0.025603 |
| 25 | 602 | −0.613329 | 0.633853 | 0.882011 | 0.0254871 | 0.014924 |
| 25 | 604 | −0.210678 | 0.966257 | 0.988958 | 0.0234105 | 0.012561 |
| 25 | 606 | 0.359349 | 1.28961 | 1.33874 | 0.0243974 | 0.016745 |
| 25 | 608 | 1.07663 | 0.89729 | 1.40152 | 0.028208 | 0.035061 |
| 37.5 | 600 | −0.079109 | 1.6231 | 1.62502 | 0.0391462 | 0.033551 |
| 37.5 | 602 | −0.207297 | 1.40928 | 1.42444 | 0.036144 | 0.015412 |
| 37.5 | 604 | −0.058849 | 1.73794 | 1.73893 | 0.035006 | 0.008795 |
| 37.5 | 606 | 0.335888 | 1.90321 | 1.93262 | 0.0359723 | 0.018708 |
| 37.5 | 608 | 0.946577 | 1.1986 | 1.5273 | 0.0389452 | 0.038658 |
| 50 | 600 | 1.28921 | −0.96207 | 1.60861 | 0.0492443 | 0.056489 |
| 50 | 602 | 0.261464 | −1.00092 | 1.03450 | 0.0471902 | 0.03219 |
| 50 | 604 | −0.405953 | −0.714664 | 0.821914 | 0.0466375 | 0.018965 |
| 50 | 606 | −0.753775 | −0.809016 | 1.10575 | 0.0476858 | 0.02652 |
| 50 | 608 | −0.82272 | −1.99027 | 2.15361 | 0.0502807 | 0.047096 |

Further details regarding the projection objectives shown in FIGS. 24 and 25 can be taken from US 2007/0058269 A1, the entire content of which is hereby incorporated by reference. The optical element according to this invention can also be included in further embodiments of projection objectives described in this reference.

While the invention has been described with respect to a limited number of embodiments and applications, it will be appreciated that many variations, modifications and other applications of the invention may be made. The applicant seeks, therefore, to cover all such variations, modifications and other applications as fall within the spirit and scope of the invention, as defined by the appended claims, and equivalents thereof.

The invention claimed is:

1. An optical element having an optical surface, which optical surface is adapted to a non-spherical target shape, such that a long wave variation of the actual shape of the optical surface with respect to the target shape is limited to a maximum value of 0.2 nm, wherein the long wave variation includes only oscillations having a spatial wavelength equal to or larger than a minimum spatial wavelength of 10 mm.

2. An optical element having an optical surface, which optical surface is adapted to a non-spherical target shape, wherein a best fitting spherical surface of the target shape has a rotational axis of symmetry and the optical surface has a clear aperture defined by the maximum diameter of the optical surface when viewed in direction of the rotational axis of symmetry, and which optical surface is configured such that a long wave variation of the actual shape of the optical surface with respect to the target shape is limited to a maximum value of 0.2 nm, wherein the long wave variation includes only oscillations having a spatial wavelength equal to or larger than a minimum spatial wavelength of one fifth of the clear aperture.

3. The optical element according to claim 1, wherein the maximum value, to which the long wave variation of the actual shape of the optical surface with respect to the target shape is limited, is 0.1 nm.

4. The optical element according to claim 1, wherein the long wave variation of the actual shape from the target shape is defined as the largest amplitude of deviations of the actual shape from the target shape at any location of the optical surface equal to or larger than the minimum spatial wavelength.

5. The optical element according to claim 1, wherein the long wave variation of the actual shape from the target shape is defined by the root mean square (RMS) value of a number of local amplitudes at respective locations of the optical surface, wherein the local amplitudes are respective maximum amplitudes of deviations of the actual shape from the target shape equal to or larger than the minimum spatial wavelength.

6. The optical element according to claim 1, wherein the target shape of the optical surface is a free form surface having no rotational symmetry and the target shape has a deviation from its best fitting spherical surface of at least 5 μm.

7. The optical element according to claim 1, wherein the target shape of the optical surface is a rotationally symmetric aspherical surface and the target shape has a deviation from its best fitting spherical surface of at least 500 μm.

8. The optical element according to claim 1, wherein the target shape of the optical surface is configured as an off-centered section of a rotationally symmetric aspherical surface and the target shape has a deviation from its best fitting spherical surface of at least 500 μm.

9. The optical element according to claim 1, wherein the optical element is manufactured to a tolerance sufficient for microlithographic application.

10. The optical element according to claim 1, wherein the optical element is manufactured to a tolerance sufficient for microlithographic application using extreme ultraviolet radiation.

11. The optical element according to claim 1, wherein the actual shape of the optical surface deviates from the target shape by a maximum of 0.2 nm.

12. The optical element according to claim 1, wherein the optical element is configured as a mirror.

13. The optical element according to claim 1,
wherein a roughness related height variation of the optical surface having a spatial wavelength between 1 μm and 1 mm is less than 70 pm.

14. A projection objective of a projection exposure tool for microlithography comprising at least one optical element according to claim 1.

15. A method of measuring a deviation of an actual shape of an optical test surface from a non-spherical target shape, said method comprising:
  irradiating a diffractive wave shaping structure with an incoming wave of electromagnetic radiation to generate upon interaction of the incoming wave with the diffractive wave shaping structure an adapted wave having a wave front adapted to the non-spherical target shape, wherein a distortion of the diffractive wave shaping structure with respect to a design configuration of the diffractive wave shaping structure is known with an accuracy of better than 0.2 nm,
  irradiating the optical test surface with the adapted wave to generate upon interaction of the adapted wave with the optical test surface a measurement wave,
  measuring the wave front of the measurement wave, and
  determining the deviation of the actual shape of the optical test surface from the measured wavefront taking the known distortion of the diffractive wave shaping structure into account.

16. The method according to claim 15,
wherein the distortion of the diffractive wave shaping structure is known with an accuracy of better than 0.05 nm.

17. The optical element according to claim 2,
wherein the maximum value, to which the long wave variation of the actual shape of the optical surface with respect to the target shape is limited, is 0.1 nm.

18. The optical element according to claim 2,
wherein the long wave variation of the actual shape from the target shape is defined as the largest amplitude of deviations of the actual shape from the target shape at any location of the optical surface equal to or larger than the minimum spatial wavelength.

19. The optical element according to claim 2,
wherein the long wave variation of the actual shape from the target shape is defined by the root mean square (RMS) value of a number of local amplitudes at respective locations of the optical surface, wherein the local amplitudes are respective maximum amplitudes of deviations of the actual shape from the target shape equal to or larger than the minimum spatial wavelength.

20. A projection objective of a projection exposure tool for microlithography comprising at least one optical element according to claim 2.

* * * * *

UNITED STATES PATENT AND TRADEMARK OFFICE
CERTIFICATE OF CORRECTION

PATENT NO. : 8,089,634 B2
APPLICATION NO. : 12/684632
DATED : January 3, 2012
INVENTOR(S) : Jochen Hetzler et al.

Page 1 of 1

It is certified that error appears in the above-identified patent and that said Letters Patent is hereby corrected as shown below:

Title Page, Item (56) "OTHER PUBLICATIONS", line 4: delete "asperic" and insert -- aspheric -- therefor Title Page 2, Item (56) column 2, under "OTHER PUBLICATIONS", line 34: delete "Punlication" and insert -- Publication -- therefor In the Specifications Column 6, line 30: delete "proceeding" and insert -- preceding -- therefor Column 13, line 31: delete "suface" and insert -- surface -- therefor Column 13, line 42: delete "suface" and insert -- surface -- therefor Column 28, line 29, in TABLE 1B: delete "$X^4Y5$" and insert -- $X^4Y^5$ -- therefor In the Claims Column 33, line 4: in claim 13, delete "70 pm." and insert -- 70 µm. -- therefor Signed and Sealed this
Fourteenth Day of May, 2013

Teresa Stanek Rea
*Acting Director of the United States Patent and Trademark Office*